United States Patent
Takihara et al.

(10) Patent No.: US 10,137,661 B2
(45) Date of Patent: Nov. 27, 2018

(54) MICRORELIEF STRUCTURAL BODY, DECORATIVE SHEET, DECORATIVE RESIN MOLDED BODY, METHOD FOR PRODUCING MICRORELIEF STRUCTURAL BODY, AND METHOD FOR PRODUCING DECORATIVE RESIN MOLDED BODY

(71) Applicant: Mitsubishi Rayon Co., Ltd., Chiyoda-ku (JP)

(72) Inventors: Tsuyoshi Takihara, Tokyo (JP); Eiko Okamoto, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 406 days.

(21) Appl. No.: 14/780,698

(22) PCT Filed: Apr. 4, 2014

(86) PCT No.: PCT/JP2014/059965
§ 371 (c)(1),
(2) Date: Sep. 28, 2015

(87) PCT Pub. No.: WO2014/163185
PCT Pub. Date: Oct. 9, 2014

(65) Prior Publication Data
US 2016/0052227 A1  Feb. 25, 2016

(30) Foreign Application Priority Data

Apr. 5, 2013  (JP) .................................. 2013-079743
Feb. 21, 2014  (JP) .................................. 2014-031730

(51) Int. Cl.
*B32B 3/30*  (2006.01)
*B32B 27/06*  (2006.01)
(Continued)

(52) U.S. Cl.
CPC .............. *B32B 3/30* (2013.01); *B29C 33/424* (2013.01); *B29C 37/0032* (2013.01);
(Continued)

(58) Field of Classification Search
CPC ..... Y10T 428/24355; Y10T 428/24479; B32B 3/30; B32B 27/06; B32B 27/08;
(Continued)

(56) References Cited

U.S. PATENT DOCUMENTS

2003/0075814 A1  4/2003  Keller et al.
2013/0004718 A1*  1/2013  Takihara ................. G02B 1/04
                                                            428/156

(Continued)

FOREIGN PATENT DOCUMENTS

EP  2284205 A1  2/2011
EP  2554366 A1  2/2013
(Continued)

OTHER PUBLICATIONS

Office Action dated Feb. 21, 2017, for corresponding Japanese Patent Application No. 2013-079743.
(Continued)

*Primary Examiner* — Joanna Pleszczynska
(74) *Attorney, Agent, or Firm* — Morgan, Lewis & Bockius LLP

(57) ABSTRACT

A structural body which comprises a base and a microrelief structure layer having a microrelief structure. The microrelief structure layer is laminated on the base so as to form the surface layer of this structural body, and the microrelief structure layer has at least one physical property selected from the group consisting of (A) and (B) described below. (A) The elastic modulus at 25° C. is 50 MPa or more, and
(Continued)

the elastic modulus at 80° C. is 30 MPa or less. (B) The tensile elongation at break at 80° C. is from 20% to 100% (inclusive).

15 Claims, 5 Drawing Sheets

(51) Int. Cl.
  *B32B 27/08*    (2006.01)
  *B32B 27/30*    (2006.01)
  *B29C 33/42*    (2006.01)
  *B29C 45/16*    (2006.01)
  *B29C 51/02*    (2006.01)
  *B29C 37/00*    (2006.01)
  *G02B 1/118*    (2015.01)
  *B32B 27/36*    (2006.01)
  *B29C 45/14*    (2006.01)
  *B29L 31/00*    (2006.01)
  *B29C 51/14*    (2006.01)
  *B29K 33/04*    (2006.01)
  *B29K 69/00*    (2006.01)
  *B29K 105/00*    (2006.01)

(52) U.S. Cl.
  CPC ...... *B29C 45/1418* (2013.01); *B29C 45/1679* (2013.01); *B29C 51/02* (2013.01); *B32B 27/06* (2013.01); *B32B 27/08* (2013.01); *B32B 27/304* (2013.01); *B32B 27/308* (2013.01); *B32B 27/36* (2013.01); *B32B 27/365* (2013.01); *G02B 1/118* (2013.01); *B29C 51/14* (2013.01); *B29C 2037/0042* (2013.01); *B29K 2033/04* (2013.01); *B29K 2069/00* (2013.01); *B29K 2105/256* (2013.01); *B29K 2995/0024* (2013.01); *B29K 2995/0093* (2013.01); *B29L 2031/756* (2013.01); *B32B 2307/408* (2013.01); *B32B 2307/51* (2013.01); *B32B 2307/54* (2013.01); *B32B 2307/738* (2013.01); *B32B 2451/00* (2013.01)

(58) Field of Classification Search
  CPC ............... B32B 27/304; B32B 27/308; B32B 2307/408; B32B 2307/51; B32B 2307/54; B32B 27/40; G02B 1/111; G02B 1/118; G02B 1/11; B29C 33/424; B29C 45/1418; B29C 45/1679; B29C 51/02
  See application file for complete search history.

(56) References Cited

U.S. PATENT DOCUMENTS

| | | |
|---|---|---|
| 2013/0129977 A1 | 5/2013 | Takihara et al. |
| 2013/0302564 A1 | 11/2013 | Takihara et al. |
| 2014/0127463 A1 | 5/2014 | Otani et al. |

FOREIGN PATENT DOCUMENTS

| | | |
|---|---|---|
| JP | 08-323934 A | 12/1996 |
| JP | 11-147237 A | 6/1999 |
| JP | 2000-071290 A | 3/2000 |
| JP | 2001-287313 A | 10/2001 |
| JP | 2001-525269 A | 12/2001 |
| JP | 2002-080678 A | 3/2002 |
| JP | 2002-080679 A | 3/2002 |
| JP | 2005-097351 A | 4/2005 |
| JP | 2005-139416 A | 6/2005 |
| JP | 2005-163003 A | 6/2005 |
| JP | 2005-262452 A | 9/2005 |
| JP | 2009-248477 A | 10/2009 |
| JP | 2010-082829 A | 4/2010 |
| JP | 2010-082871 A | 4/2010 |
| JP | 2010-149524 A | 7/2010 |
| JP | 2010-188584 A | 9/2010 |
| JP | 2010-196026 A | 9/2010 |
| JP | 2010-214796 A | 9/2010 |
| JP | 2011-128512 A | 6/2011 |
| JP | 2012-139914 A | 7/2012 |
| JP | 2012-153107 A | 8/2012 |
| JP | 2012-196965 A | 10/2012 |
| JP | 2012-201032 A | 10/2012 |
| JP | 2013-039711 A | 2/2013 |
| WO | 2011/125699 A1 | 10/2011 |
| WO | 2011/155365 A1 | 12/2011 |
| WO | 2012/096322 A1 | 7/2012 |
| WO | 2013/005769 A1 | 1/2013 |

OTHER PUBLICATIONS

Extended European Search Report dated May 13, 2016 for corresponding European Patent Application No. 14778432.6.
International Search Report dated Jul. 8, 2014, for International application No. PCT/JP2014/059965.

\* cited by examiner

MICRORELIEF STRUCTURAL BODY, DECORATIVE SHEET, DECORATIVE RESIN MOLDED BODY, METHOD FOR PRODUCING MICRORELIEF STRUCTURAL BODY, AND METHOD FOR PRODUCING DECORATIVE RESIN MOLDED BODY

TECHNICAL FIELD

The present invention relates to a microrelief structural body having excellent antireflection performance and being moldable by three-dimensionally molding such as insert molding or in-mold lamination, a decorative sheet, a decorative resin molded body, and a curable composition for forming the microrelief structural body. The invention also relates to a method for producing a microrelief structural body having excellent antireflection performance and being moldable by three-dimensional molding, and a method for producing a decorative resin molded body.

The present patent application claims priority based on Japanese Patent Application No. 2013-079743 filed in Japan on Apr. 5, 2013, and Japanese Patent Application No. 2014-031730 filed in Japan on Feb. 21, 2014, the disclosures of which are incorporated herein by reference.

BACKGROUND ART

In fields where higher design characteristics are required, such as light covers and front face plates of various displays, it is demanded to impart antireflection performance to these final manufactured products in order to reduce "background reflections". In applications for which reduction of background reflections is desirable, such as displays and lenses, various antireflective technologies have been applied; however, there is a problem that deployment of such technologies on curved surfaces or complicated shapes is difficult.

Regarding related art technologies, there is known a technology of preventing reflection by subjecting surfaces of final manufactured products to a multilayer coating obtained by laminating a high refractive index resin and a low refractive index resin; however, it is very difficult to apply this antireflective technology based on multilayer coating to curved surfaces or complicated shapes.

On the other hand, it is known that a microrelief structural body having a microrelief structure, in which minute-sized concavities and convexities are regularly arranged on the surface, exhibits antireflection performance by continuously changing the refractive index. In order for a microrelief structure to exhibit satisfactory antireflection performance, it is necessary that the interval between adjoining convexities or concavities be of a size less than or equal to the wavelength of visible light. When such a microrelief structure is applied to the surface of an object such as a display or a lens, satisfactory antireflection performance can be imparted to these final manufactured products. It is also known that such a microrelief structural body exhibits super water-repellent performance due to the lotus effect.

Regarding the method for producing a microrelief structural body, a method of disposing an active energy ray-curable composition between a mold and a light-transmissive base material, curing the active energy ray-curable composition by means of irradiation of active energy radiation, thereby transferring the concavo-convex shapes of the mold, and then detaching the mold; a method of transferring the concavo-convex shapes of a mold to an active energy ray-curable composition, subsequently detaching the mold, and then curing the active energy ray-curable composition by irradiating the composition with active energy radiation; and the like are known. However, it is not easy to obtain antireflection performance by providing the aforementioned microrelief structure on the surface of a manufactured product having a complicated shape, and there is also a problem in view of production cost.

On the other hand, as a method for imparting designability, weather resistance, scratch resistance and the like to the surface of a molded body having a complicated shape, there is known a method of laminating a decorative sheet on the surface of a molded body. Examples of the method for forming such a decorative resin molded body having a decorative sheet laminated on the surface, include an insert molding method of having a decorative sheet molded in advance into a three-dimensional shape using a vacuum molding mold, inserting the molded sheet into an injection molding mold, injecting a resin material in a fluid state into the mold, and thereby integrating the resin material and the molded sheet; and an injection molding with simultaneous decorating method of integrating a decorative sheet that has been inserted into a mold at the time of injection molding, with a molten resin that has been injected into the cavity, and thus decorating the surface of the resin molded body.

Therefore, in the case of imparting the aforementioned performances (for example, designability, weather resistance, and scratch resistance) other than antireflection performance to the surface of a molded body, it is necessary to perform three-dimensional molding such as insert molding or press molding, and a sheet and a film which can be molded by such three-dimensional molding are desired.

The antireflective film with multilayer coating described above exhibits antireflection performance by precisely controlling the refractive indices and thicknesses of various layers, and therefore, when such a film is used in three-dimensional molding such as insert molding or press molding, there is a problem that the intrinsic antireflection performance cannot be sufficiently exhibited.

Patent Documents 1 and 2 disclose methods for producing an antireflective article having a microrelief structure on the surface, by providing a microrelief structure on the surface of a template having a curved surface, and performing press molding or injection molding.

In these methods described in Patent Documents 1 and 2, an intended microrelief structure can be provided to a molded body by providing a reverse structure of a microrelief structure in the mold; however, it is difficult to form a reverse structure of an intended microrelief structure in the mold, and since it is a premise that a molten resin that can be injection molded is used, it is very difficult to impart functions other than the antireflection performance.

Furthermore, in a case in which the microrelief structure described above is used for three-dimensional molding, the microrelief structure has inferior scratch resistance compared to molded bodies such as a hard coat having smooth surface that has been produced using the same curable composition, and therefore, a molded body laminated with the microrelief structure has a problem with durability during use.

Patent Document 3 discloses that from the viewpoint of scratch resistance, it is preferable that the cured resin that constitutes a microrelief structure has a high elastic modulus.

Furthermore, in a structure in which micro-convexities are arranged to stand close together, when the aspect ratio of the micro-convexities is high, and the elastic modulus of the cured resin is low, a phenomenon in which adjacent convexities draw close together may occur. An aggregate of convexities that have drawn close together may be considered as one large convexity; however, it is known that when the aggregate of convexities acquire a size equivalent to the wavelength of visible light, diffuse reflection of light occurs, so that the microrelief structure turns cloudy and has a high haze value. That is, in a case in which a cured product of an active energy ray-curable composition used for the production of a microrelief structure is not sufficiently solid, there occurs a phenomenon in which convexities of micro-concavo-convex shapes draw close together as a result of release from the template or heating, and as a result, there is a problem that the antireflection performance is deteriorated.

From these reasons, regarding the curable composition for forming a microrelief structural body, it is general to use a curable composition which gives a cured product having a high elastic modulus, so as to avoid close drawing of convexities and an increase in the haze value, while maintaining the antireflection performance. However, such a curable composition gives a cured product that lacks "elongation", that is, lacks "stretchability". Therefore, it is impossible to perform the three-dimensional molding previously mentioned.

When a microrelief structural body is formed using a curable composition which can give a cured product having excellent flexibility and stretchability, it is possible to use the microrelief structural body for three-dimensional molding; however, the phenomenon in which convexities draw close together occurs, and the antireflection performance is impaired. For example, when a microrelief structural body is formed using a curable composition including a bifunctional monomer and a hexafunctional oligomer as described in Patent Document 4, convexities draw close together and grow into a size capable of scattering light, and the microrelief structural body acquires a cloudy external appearance.

DOCUMENTS OF RELATED ART

Patent Documents

Patent Document 1: JP 2000-71290 A
Patent Document 2: JP 2001-525269 A
Patent Document 3: WO 2012/096322 A
Patent Document 4: JP 2012-139914 A

SUMMARY OF THE INVENTION

Problems to be Solved by the Invention

The present invention was achieved in order to solve the problems described above. That is, an object of the present invention is to provide a microrelief structural body having excellent antireflection performance and being applicable to three-dimensional molding, a curable composition, a decorative sheet, a decorative resin molded body obtainable by molding the decorative sheet, a method for producing a microrelief structural body, and a method for producing a decorative resin molded body.

Means to Solve the Problems

A critical requirement for the antireflection performance in a microrelief structure is that when viewed in a direction perpendicular to the microrelief structured surface, as the ratio of the microrelief structural body and air at a cross-section of the microrelief structural body continuously varies, the refractive index apparently continuously varies, and thereby, the microrelief structural body behaves as if there is no interface. The inventors of the present invention found that the antireflection performance exhibited by such a microrelief structure does not necessarily need a structure in which microconvexities are arranged to stand close together, and there is no significant difference in the antireflection performance even with a reverse structure of microconvexities, that is, a structure in which microconcavities are formed orderly. As long as a "microrelief structure" in which the interval between microconcavities is of a size less than or equal to the wavelength of visible light is used, even if a microrelief structural body is formed using a curable composition which gives a cured product having a low elastic modulus, convexities do not undergo integration.

The inventors of the present invention found that when a microrelief structural body having a microrelief structure is formed using a curable composition which produces, after curing, a resin having high flexibility and high stretchability, a microrelief structural body having antireflection performance and being moldable by three-dimensional molding, and a decorative sheet can be obtained, thus completing the present invention.

Furthermore, the inventors also found that when a cured product of a curable composition has a particular elastic modulus at room temperature, impairment of the antireflection performance caused by the phenomenon of convexities drawing close together can be avoided, and when a microrelief structural body having a microrelief structure is formed using a curable composition which can exhibit flexibility and stretchability in a temperature region for actually performing molding, a microrelief structural body having antireflection performance and being moldable by three-dimensional molding, and a decorative sheet can be obtained, thus completing the present invention.

That is, embodiments of the present invention have the following features.

[1-1] A microrelief structural body having a microrelief structure on the surface, the microrelief structural body being formed from a cured product of a curable composition, wherein the cured product has a tensile elongation at break at 80° C. of 20% or more.

[1-2] The microrelief structural body according to [1-1], wherein the toughness of the cured product determined in a tensile test at 80° C. is 1 kJ/m$^2$ or more.

[1-3] A curable composition for forming the microrelief structural body according to [1-1] or [1-2], the curable composition including at least one monomer selected from the group consisting of a monofunctional monomer (X), a bifunctional monomer (Y), and a polyfunctional monomer having three or more functional groups (Z), in an amount of 70 parts by mass or more relative to 100 parts by mass of the curable components, wherein the mass average molecular weight of the bifunctional monomer (Y) is 600 or more, and the value obtained by dividing the mass average molecular weight of the polyfunctional monomer (Z) by the number of polymerizable functional groups is 300 or more.

[1-4] The curable composition according to [1-3], wherein the bifunctional monomer (Y) is one or more bifunctional acrylates selected from the group consisting of a bifunctional urethane di(meth)acrylate and a bifunctional polyether di(meth)acrylate; the polyfunctional monomer (Z) is one or more polyfunctional acrylates selected from the group consisting of a trifunctional or higher-functional urethane (meth)acrylate and a trifunctional or higher-functional polyether (meth)acrylate; and the total amount of the bifunctional acrylate and the polyfunctional acrylate is 30 parts by mass or more relative to 100 parts by mass of the curable components.

[1-5] The microrelief structural body according to [1-1] or [1-2], wherein the curable composition includes at least one monomer selected from the group consisting of a monofunctional monomer (X), a bifunctional monomer (Y), and a polyfunctional monomer having three or more functional groups (Z), in an amount of 70 parts by mass or more relative to 100 parts by mass of the curable components; the mass average molecular weight of the bifunctional monomer (Y) is 600 or more; and the value obtained by dividing the mass average molecular weight of the polyfunctional monomer (Z) by the number of polymerizable functional groups is 300 or more.

[1-6] The microrelief structural body according to [1-5], wherein the bifunctional monomer (Y) is one or more bifunctional acrylates selected from a bifunctional urethane (meth)acrylate and a bifunctional polyether (meth)acrylate; the polyfunctional monomer (Z) is one or more polyfunctional acrylates selected from the group consisting of a trifunctional or higher-functional urethane (meth)acrylate and a trifunctional or higher-functional polyether (meth) acrylate; and the total amount of the bifunctional acrylate and the polyfunctional acrylate is 30 parts by mass or more relative to 100 parts by mass of the curable components.

[1-7] A decorative sheet including the microrelief structural body according to [1-1] or [1-2].

[1-8] A decorative resin molded body including the decorative sheet according to [1-7].

[1-9] A member for vehicles, including the decorative resin molded body according to [1-8].

[1-10] A member for display, including the decorative resin molded body according to [1-8].

[1-11] A method for producing a microrelief structural body having a microrelief structure on the surface, the method including a step of disposing the curable composition according to [1-3] or [1-4] between a base material and a surface of a mold, the mold having a microconvexity structure on that surface; curing the curable composition, and then detaching the mold.

[1-12] A method for producing a decorative resin molded body having a microrelief structure on the surface, the method including a step (A1) of heating the decorative sheet according to [1-7], pressing the heated decorative sheet against a mold by drawing a vacuum or blowing compressed air, and obtaining a decorative resin molded body having a microrelief structure on the surface.

[1-13] A method for producing a decorative resin molded body having a microrelief structure on the surface, the method including a step (B1) of pressing the decorative sheet according to [1-7] against a mold while heating to thereby transfer the mold shape, taking out from the mold the decorative sheet as a resultant of transfer of the mold shape, and thereby obtaining a decorative sheet having the mold shape transferred thereto; and a step (B2) of disposing the decorative sheet obtained in the above step (B1) such that the side where a microrelief structure has been formed is brought into contact with the surface of an injection molding die, injecting a resin material in a molten state into the injection molding die, solidifying the resin material, and thereby obtaining a decorative resin molded body having a molded base material formed of a resin material, and a decorative sheet having the surface on the opposite side of the side where the microrelief structure has been formed is in contact with the molded base material.

[1-14] A method for producing a decorative resin molded body having a microrelief structure on the surface, the method including a step (C1) of disposing the decorative sheet according to [1-7] such that the side where a microrelief structure has been formed is brought into contact with an injection molding die; and a step (C2) of pressing a mold against the decorative sheet, while heating the decorative sheet inside the injection molding die, so that the decorative sheet conforms to the inner surface of the injection molding die, subsequently clamping the mold, injecting a resin material in a molten state into the die, solidifying the resin material, and thereby obtaining a decorative resin molded body having a molded base material formed of a resin material, and a decorative sheet in which the surface of the opposite side of the side where the microrelief structure has been formed is in contact with the molded base material.

[1-15] A method for producing a decorative resin molded body having a microrelief structure on the surface, the method including a step (D1) of pressing a heated mold against the decorative sheet according to [1-7] to thereby transfer the shape of the mold, and obtaining a decorative resin molded body having a microrelief structure on the surface.

[2-1] A curable composition for forming a microrelief structure, the curable composition producing a cured product having an elastic modulus at 25° C. of 50 MPa or more and an elastic modulus at 80° C. of 30 MPa or less.

[2-2] The curable composition according to [2-1], wherein the toughness of the cured product determined in a tensile test at 80° C. is 1 kJ/m$^2$ or more.

[2-3] The curable composition according to [2-1] or [2-2], wherein the total amount of a monofunctional monomer and a bifunctional monomer is 50 parts by mass or more relative to 100 parts by mass of curable components in the curable composition.

[2-4] A microrelief structural body formed from a cured product of the curable composition according to [2-1] to [2-3].

[2-5] A sheet having the microrelief structural body according to [2-4], wherein the aspect ratio of the microrelief structure is 0.6 to 1.5.

[2-6] A decorative sheet including: a resin sheet as a base material, the resin sheet containing an acrylic resin, a polyester resin, a polycarbonate resin, an acrylonitrile-butadiene-styrene copolymer resin, a polyvinylidene fluoride resin, a vinyl chloride resin, an alloy of these resins, or a laminated structural body of these resins; and the microrelief structural body according to [2-4] on at least one surface of the base material.

[2-7] A decorative resin molded body, including the decorative sheet according to [2-6].

[2-8] A member for vehicles, including the decorative resin molded body according to [2-7].

[2-9] A member for displays, including the decorative resin molded body according to [2-7].

[2-10] An electronic manufactured product, including the decorative resin molded body according to [2-7].

[2-11] The decorative resin molded body according to [2-7], wherein the microrelief structure has different pitches in two axial directions that run straight.

[2-12] A method for producing a decorative resin molded body having a microrelief structure on the surface, the method including the following step (A1):

Step (A1): a step of heating the decorative sheet according to [2-6], pressing the heated decorative sheet against a mold by drawing a vacuum or blowing compressed air, and thereby obtaining a decorative resin molded body having a microrelief structure on the surface.

[2-13] A method for producing a decorative resin molded body having a microrelief structure on the surface, the method including the following steps (B1) and (B2):

Step (B1): a step of pressing a mold against the decorative sheet according to [2-6] while heating the decorative sheet to thereby transfer the mold shape, taking out from the mold the sheet as a resultant of transfer of the mold shape, and thereby obtaining a decorative sheet having the mold shape transferred thereto:

Step (B2): a step of disposing the decorative sheet obtained in the above step (B1) such that the side where a microrelief structure has been formed is in contact with the surface of an injection molding die, injecting a resin material in a molten state into the injection molding die, solidifying the resin material, and thereby obtaining a decorative resin molded body including a molded base material formed of a resin material, and a decorative sheet in which the surface on the opposite side of the side where the microrelief structure has been formed is in contact with the molded base material.

[2-14] A method for producing a decorative resin molded body having a microrelief structure on the surface, the method including the following step (C1) and step (C2):

Step (C1): a step of disposing the decorative sheet according to [2-6] such that the side where a microrelief structure has been formed is brought into contact with an injection molding die; and Step (C2): a step of pressing a mold against the sheet, while heating the sheet inside the injection molding die, so that the sheet conforms to the inner surface of the injection molding die, subsequently clamping the mold, injecting a resin material in a molten state into the die, solidifying the resin material, and thereby obtaining a decorative resin molded body including a molded base material formed of a resin material, and a decorative sheet in which the surface on the opposite side of the side where the microrelief structure has been formed is in contact with the molded base material.

[2-15] A method for producing a decorative resin molded body having a microrelief structure on the surface, the method including the following step (D1):

Step (D1): a step of pressing a heated mold against the decorative sheet according to [2-6] to thereby transfer the shape of the mold, and obtaining a decorative resin molded body having a microrelief structure on the surface.

[2-16] A method for producing a decorative resin molded body having a microrelief structure on the surface, the method including the following step (E1):

Step (E1): a step of heating the decorative sheet according to [2-6], pressing a molded article against the decorative sheet, causing the decorative sheet to conform to the shape of the molded article by applying pressure and/or reducing pressure, and thus obtaining a decorative resin molded body having a microrelief structure on the surface of a molded article.

That is, the present invention relates to the following:

[1] A structural body including a base material and a microrelief structure layer having a microrelief structure, wherein the microrelief structure layer is laminated on the base material as a surface layer of the structural body, and the microrelief structure layer has at least one property selected from the group consisting of the following properties (A) and (B):

(A) the elastic modulus at 25° C. is 50 MPa or more, and the elastic modulus at 80° C. is 30 MPa or less; and (B) the tensile elongation at break at 80° C. is from 20% to 100%.

[2] The structural body according to [1], wherein the toughness determined in a tensile test at 80° C. is from 1 $kJ/m^2$ to 20 $kJ/m^2$.

[3] The structural body according to [1] or [2], wherein the microrelief structure layer contains a cured product of a curable composition including a monomer having one radical polymerizable double bond (X') and a monomer having two radical polymerizable double bonds (Y'), the total amount of the monomer having one radical polymerizable double bond (X') and the monomer having two radical polymerizable double bonds (Y') is from 50 parts by mass to 100 parts by mass relative to 100 parts by mass of the curable components in the curable composition, the monomer having two radical polymerizable double bonds (Y') is a monomer having a mass average molecular weight of from 300 to 8000 and having at least one bonding selected from the group consisting of hydrogen bonding, π-π interaction, and ion bridging.

[4] The structure according to [1] or [2], wherein the microrelief structure layer contains a cured product obtained by curing a curable composition; the curable composition includes at least one monomer selected from the group consisting of a monomer having one radical polymerizable double bond (X), a monomer having two radical polymerizable double bonds (Y), and a monomer having three or more radical polymerizable double bonds (Z), in an amount of from 70 parts by mass to 100 parts by mass relative to 100 parts by mass of the curable components in the curable composition; the monomer having two radical polymerizable double bonds (Y) has a mass average molecular weight of from 600 to 8000; and the value obtained by dividing the mass average molecular weight of the monomer having three or more radical polymerizable double bonds (Z) by the number of groups having polymerizable double bonds is from 300 to 1000.

[5] The structural body according to [4], wherein the monomer having two radical polymerizable double bonds (Y) is one or more acrylates each having two radical polymerizable double bonds, selected from the group consisting of a urethane (meth)acrylate having two radical polymerizable double bonds and a polyether (meth)acrylate having two radical polymerizable double bonds; the monomer having three or more radical polymerizable double bonds (Z) is one or more acrylates each having three or more radical polymerizable double bonds, selected from the group consisting of a urethane (meth)acrylate having three or more radical polymerizable double bonds and a polyether (meth) acrylate having three or more radical polymerizable double bonds; and the total amount of the acrylate having two radical polymerizable double bonds and the acrylate having three or more radical polymerizable double bonds is from 30 parts by mass to 80 parts by mass relative to 100 parts by mass of the curable components in the curable composition.

[6] A sheet including a resin sheet base material containing at least one resin selected from the group consisting of an acrylic resin, a polyester resin, a polycarbonate resin, an acrylonitrile-butadiene-styrene copolymer resin, a polyvinylidene fluoride resin, a vinyl chloride resin, and a composite of these resins; and the structural body according to [1] or [2] laminated on at least one surface of the resin sheet base material.

[7] A decorative sheet including the sheet according to [6].

[8] A molded body including a molded base material and the decorative sheet according to [7], wherein the decorative sheet is such that the surface on the opposite side of the side where the microrelief structure of the decorative sheet has been formed is in contact with the molded base material.

[9] The molded body according to [8], wherein at least one interval selected from the group consisting of the interval between adjacent concavities and the interval between convexities in the microrelief structure is different in two axial directions that run straight.

[10] The method for producing a structural body having a microrelief structure on the surface according to [1], the method including:

disposing a curable composition between a base material and a surface of a mold, the surface having a microrelief structure;

polymerizing the curable composition; and detaching the mold after polymerizing the curable composition.

[11] A method for producing a decorative resin molded body having a microrelief structure on the surface, the method including a step (A1) of obtaining a decorative resin molded body, step (A1) including heating the decorative sheet according to [7]; and pressing the heated decorative sheet against a mold by drawing a vacuum or blowing compressed air, and obtaining a decorative resin molded body having a microrelief structure on the surface.

[12] A method for producing a decorative resin molded body having a microrelief structure on the surface, the method including:

a step (B1) including pressing a mold against the decorative sheet according to [7] while heating the decorative sheet to transfer the mold shape to the decorative sheet, taking out from the mold the decorative sheet as a resultant of transfer of the mold shape, and thereby obtaining a decorative sheet having the mold shape transferred thereto; and a step (B2) including arranging the decorative sheet obtained in the above step (B1) such that the side where the microrelief structure has been formed is brought into contact with the surface of an injection molding die, injecting a resin material in a molten state into the injection molding die, solidifying the resin material, and obtaining a decorative resin molded body including a molded base material formed of the solidified resin material, and a decorative sheet in which the surface on the opposite side of the side where the microrelief structure has been formed is in contact with the molded base material.

[13] A method for producing a decorative resin molded body having a microrelief structure on the surface, the method including:

a step (C1) of arranging the decorative sheet according to [7] such that the side where a microrelief structure has been formed is brought into contact with an injection molding die; and a step (C2) including heating the decorative sheet inside the injection molding die, pressing a mold to cause the decorative sheet to conform to the inner surface of the injection molding die, subsequently clamping the mold, injecting a resin material in a molten state into the die, solidifying the resin material, and obtaining a decorative resin molded body including a molded base material formed of the solidified resin material, and a decorative sheet in which the surface on the opposite side of the side where the microrelief structure has been formed is in contact with the molded base material.

[14] A method for producing a decorative resin molded body having a microrelief structure on the surface, the method including a step (D1) of pressing a heated mold against the decorative sheet according to [7] to transfer the mold shape, and obtaining a decorative resin molded body having a microrelief structure on the surface.

[15] A method for producing a decorative resin molded body having a microrelief structure on the surface, the method including a step (E1) including heating the decorative sheet according to [7], pressing a molded article against the heated decorative sheet, causing the decorative sheet to conform to the shape of molded article by applying pressure, reducing pressure, or applying pressure and reducing pressure, and obtaining a decorative resin molded body having a microrelief structure on the surface of the molded article.

[16] A decorative resin molded body produced by the production methods described in [11] to [15].

Effect of the Invention

The decorative sheet as an exemplary embodiment of the present invention is a sheet which includes a structural body including a microrelief structure layer having a microrelief structure on the surface (hereinafter, also referred to as microrelief structural body), and the microrelief structural body contains a cured product of a curable composition. Since the tensile elongation at break at 80° C. of the cured product is 20% or more, the decorative sheet enables three-dimensional molding, and avoids the impairment of the antireflection performance caused by integration of convexities. As a result, an antireflective structure can be applied to the surface of a three-dimensionally molded body having a complicated shape, which is difficult in the prior art technologies.

Furthermore, the decorative sheet as an exemplary embodiment of the present invention is a sheet which includes a microrelief structural body having on the surface a microrelief structure formed from a cured product of a curable composition. Since the elastic modulus at 25° C. of the cured product is 50 MPa or more, the impairment of the antireflection performance caused by integration of convexities can be avoided, and since the elastic modulus at 80° C. of the cured product is 30 MPa or less, the decorative sheet has excellent three-dimensional moldability. Therefore, an antireflective structure can be applied to the surface of a three-dimensionally molded body having a complicated shape.

EMBODIMENTS FOR CARRYING OUT THE INVENTION

MODE(S) FOR CARRYING OUT THE INVENTION

Figure 1A:
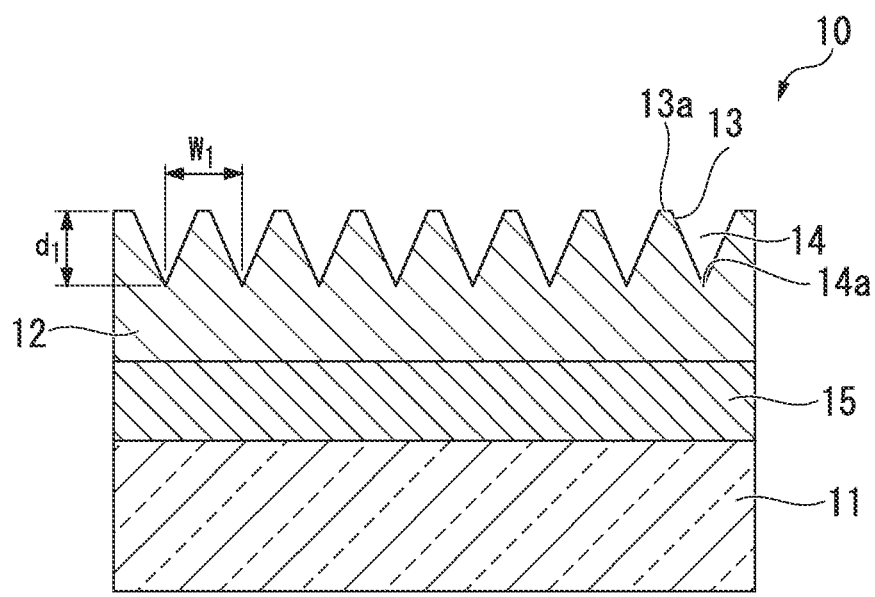
FIG. 1A is a schematic cross-sectional diagram illustrating a microrelief structural body according to an exemplary embodiment of the present invention.

According to the present specification and the claims, the term "(meth)acrylate" means acrylate or methacrylate. Also, the term "active energy radiation" means visible light, ultraviolet radiation, an electron beam, plasma, thermal radiation (infrared radiation or the like), or the like.

The microrelief structural body according to an exemplary embodiment of the present invention contains a cured product of a curable composition, and the cured product is at least one cured product selected from the group consisting of a cured product having an elastic modulus at 25° C. of 50 MPa or more and an elastic modulus at 80° C. of 30 MPa or less, and a cured product having a tensile elongation at break at 80° C. of 20% or more.

Meanwhile, the "cured product" as used herein means a composition obtained by curing a curable composition by, for example, irradiating active energy radiation or the like.

(Tensile Elongation at Break)

It is preferable that the microrelief structural body contains a cured product of a curable composition, and the tensile elongation at break at 80° C. of the cured product is from 20% to 100%.

The tensile elongation at break of the cured product according to the present specification is an indicator indicating the degree of tensile elongation of the cured product, and can be measured according to JIS K 7161.

For instance, a curable composition is poured in between two sheets of glass plates and is molded into a plate shape by curing the curable composition with a spacer having a thickness of about 0.2 mm disposed between the glass plates, and a cured product punched into a predetermined dumbbell shape from the plate is used as a specimen for tensile test.

The tensile test is carried out using a general tensile tester (for example, Tensilon Universal Tester (model: RTC-1250A-PL) at a testing rate of 1 mm/min.

The "tensile elongation at break" as used herein is a value obtained by dividing the elongation at the time point at which the specimen breaks, by the gauge length of the dumbbell, and the tensile elongation at break of the present invention refers to a value measured in an environment at 80° C.

When it is said that the tensile elongation at break is 20% or more, for example, in a case in which the punched shape is a dumbbell shape No. 2 according to the JIS standards, the gauge length is 20 mm. If it is considered that only this gauge length has been elongated, and the elongation at break is 20% or more with respect to the gauge length, when the dumbbell shaped sample is gripped by chucks, and with point at which stress begins to be applied being designated as point 0, when the sample is elongated for 4 mm or more, the tensile elongation at break is 20% or more.

If the tensile elongation at break at 80° C. is 20% or more, when a decorative sheet including the microrelief structural body according to an exemplary embodiment of the present invention is processed by three-dimensional molding, no crack is generated in the microrelief structural body, and satisfactory antireflection performance can be imparted to the surface of a molded body.

When three-dimensional molding processing into a very complicated shape, particularly a deeply drawn shape, is to be achieved, high tensile elongation is required. Therefore, higher tensile elongation at break is preferred. On the other hand, if the tensile elongation at break is too high, there is a possibility that the microrelief structure may be destroyed, and the optical performance may be impaired. Therefore, the tensile elongation at break is more preferably 30% to 100%, and particularly preferably 50% to 80%.

According to an embodiment of the present invention, the tensile elongation at break is a value calculated by punching a dumbbell specimen having a gauge length of 10 mm from a cured product produced into a thin sheet-shape having a thickness of about 200 μm according to JIS K 7161, and performing a tensile test at 80° C.

(Elastic Modulus)

It is preferable that the microrelief structural body contains a cured product of a curable composition, and the cured product has an elastic modulus at 25° C. of 50 MPa or more, and an elastic modulus at 80° C. of 30 MPa or less.

When the elastic modulus at 25° C. is 50 MPa or more, the impairment of the antireflection performance caused by the occurrence of a phenomenon that adjacent convexities draw close together, does not occur. The elastic modulus at 25° C. is preferably 70 MPa to 400 MPa, more preferably 80 MPa to 200 MPa, and even more preferably 100 MPa to 150 MPa. Furthermore, when the aspect ratio of the convexities of the microrelief structure is 0.6 to 1.5, the phenomenon of adjacent convexities drawing close together can be avoided particularly effectively.

When the elastic modulus at 80° C. is 30 MPa or less, when a decorative sheet including the microrelief structural body according to an exemplary embodiment of the present invention is processed by three-dimensional molding, no crack is generated in the microrelief structural body, and satisfactory antireflection performance can be imparted to the surface of the decorative resin molded body. The elastic modulus at 80° C. is preferably 25 MPa or less, and more preferably 10 to 20 MPa.

According to the present specification, the elastic modulus of a cured product is an indicator indicating the magnitude of elasticity of the cured product, and can be measured according to JIS K 7161. For instance, a curable composition related to the microrelief structure of the present invention is poured in between two sheets of glass plates, and is molded into a plate shape by curing the curable composition while a space having a thickness of about 0.2 mm is disposed between the glass plates. A sample punched into a predetermined dumbbell shape from the plate is used as a specimen for tensile test.

The tensile test is carried out using a general tensile tester (for example, Tensilon Universal tester (model: RTC-1250A-PL) at a test rate of 1 mm/min. The elastic modulus can be calculated by dividing the tensile stress at a tensile elongation of 1% to 2% by the tensile strain (the value obtained by dividing the tensile elongation by the gauge length of the dumbbell is tensile strain). The "elastic modulus" as used herein means a value measured in an environment at 25° C., or in an environment at 80° C.

The elastic modulus can also be measured using a general microindenter (for example, Fischerscope HM2000 manufactured by Fischer Technology, Inc.) or a general rheometer (for example, DMS6100 manufactured by Seiko Instruments, Inc.).

According to an embodiment of the present invention, the elastic modulus is an initial tensile value obtainable up to a tensile strain of 5%, which is measured by punching a dumbbell specimen having a gauge length of 10 mm from a thin sheet-shaped cured product of a curable composition having a thickness of about 200 μm according to JIS K 7161, and performing a tensile test at 25° C. and 80° C.

In the case of general thermoplastic resins, in a temperature region lower than the glass transition temperature, the polymer chains are in a glassy state with restrained movement, and the elastic modulus is almost constant. Polymer chains start micro-Brownian motion at around the glass transition temperature, and in a higher temperature region, the polymer chains are in a fluid state in which entanglement of the polymer chains is loosened, so that when a resin is drawn, the polymer chains slip through between one another.

On the contrary, in the case of thermosetting resins, the point at which polymer chains start micro-Brownian motion does not change at around the glass transition temperature; however, even in a temperature region higher than the glass transition temperature, a fluid state is not attained because there are crosslinking points, and polymer chains are not allowed to move freely.

The elastic modulus at the time of pulling is proportional to the number of crosslinking points of polymer chains, and at a low temperature, entanglements of polymer chains can also be regarded as physical crosslinking points. The elastic modulus at a high temperature higher than or equal to the glass transition temperature is hardly affected by the entanglement points of polymer chains as described above, and thus the elastic modulus reflects the number of chemical crosslinking points. As a result, in the case of thermosetting resins, there exists a temperature range called a rubbery plateau where the elastic modulus is constant, at a temperature higher than or equal to the glass transition temperature.

The phrase "the elastic modulus at 80° C. is 30 MPa or less" implies that the number of chemical crosslinking points of polymer chains is less than or equal to a certain number, and with such a crosslinking network, stretching can be achieved to a certain extent without any crack generation in the resin caused by tensile stretching at a high temperature.

It is extremely difficult to quantitatively evaluate the number of crosslinking points, and the molecular weight between crosslinking points in the case in which the constituent components of a curable composition ideally form a crosslinked structure can be calculated. However, in reality, there are crosslinking points or molecular chains that do not participate in the crosslinked structure, and thus the value representing the substantial number of crosslinking points becomes the elastic modulus.

Design of such a thermosetting resin is not easy. It is because a resin having high elasticity at room temperature also has a high elastic modulus even at a high temperature, and a resin having low elasticity at a high temperature generally has low elasticity even at room temperature.

In order to decrease the elastic modulus at a high temperature, it is not preferable to use a large amount of a monomer having three or more radical polymerizable double bonds. In order to decrease the number of chemical crosslinking points, a monomer having one radical polymerizable double bond, or a monomer having three or more radical polymerizable double bonds having a sufficiently large molecular weight relative to the number of radical polymerizable double bonds, which causes lengthening of the distance between crosslinking points, must be used.

On the other hand, in order to increase the elastic modulus at room temperature, a general technique involves using a monomer having three or more radical polymerizable double bonds. If components that do not participate in the crosslinked structure, such as a monomer having one radical polymerizable double bond, occupy a majority, the elasticity is decreased, and the components remain as unreacted monomers in the cured product. Thus, there may be adverse effects such as plasticization of the cured product.

As a method of achieving a balance between contradictory performances described above, it may be considered to use a monomer having the glass transition point of the cured product at near the molding temperature (for example, molding temperature ±120° C. to 200° C.). For example, the monomer is a monomer which gives a homopolymer having a glass transition temperature in the range of 50° C. to 150° C. Methacrylates can also be mentioned as the monomer having one radical polymerizable double bond and having a glass transition point in the relevant temperature range; however, if a methacrylate is used as a photocurable resin, the methacrylate has insufficient reactivity, and there is a possibility that the methacrylate may remain as unreacted monomer. There are also acrylates having bulky side chains and having glass transition temperatures, such as isobornyl acrylate; however, the polymer is generally hard and brittle, and there is a possibility that cracks may be generated at the time of molding. As such, a monomer having three or more radical polymerizable double bonds appropriate for molding, which is tough and has a relatively high glass transition temperature, is not common.

As a feature of a monomer suitable for achieving a balance between contradictory performances described above, it is preferable that the monomer has a chemical structure having strong intermolecular interaction. Examples of the chemical structure having strong interaction between the molecules of a monomer include hydrogen bonding, π-π interaction, and ion bridging. Since these bonds are not covalent bonds, the bonds are dynamic crosslinking points that can freely move about when the binding force becomes weak, and it is known that the binding force becomes weak in high temperature ranges. When these suitable monomers are appropriately used, a curable composition which gives a cured product that has high elasticity at room temperature and has low elasticity at a high temperature can be obtained.

Examples of the monomer having hydrogen bonding between molecules include urethane di(meth)acrylate, EBECRYL 284 (manufactured by Daicel Cytec Co., Ltd.), EBECRYL 285 (manufactured by Daicel Cytec Co., Ltd.), EBECRYL 4820 (manufactured by Daicel Cytec Co., Ltd.), EBECRYL 4858 (manufactured by Daicel Cytec Co., Ltd.), EBECRYL 8402 (manufactured by Daicel Cytec Co., Ltd.), EBECRYL 8405 (manufactured by Daicel Cytec Co., Ltd.), EBECRYL 9207 (manufactured by Daicel Cytec Co., Ltd.), EBECRYL 8701 (manufactured by Daicel Cytec Co., Ltd.), NEW FRONTIER R1214 (manufactured by Dai-ichi Kogyo Seiyaku Co., Ltd.), NEW FRONTIER R1220 (manufactured by Dai-ichi Kogyo Seiyaku Co., Ltd.), NEW FRONTIER R1235 (manufactured by Dai-ichi Kogyo Seiyaku Co., Ltd.), and NEW FRONTIER R1304 (manufactured by Dai-ichi Kogyo Seiyaku Co., Ltd.).

Examples of the monomer having π-π interaction between molecules include an ethoxylated bisphenol A di(meth) acrylate, NK ESTER A-BPE-4 (manufactured by Shin Nakamura Chemical Co., Ltd.), NK ESTER A-BPE-10 (manufactured by Shin Nakamura Chemical Co., Ltd.), NK ESTER A-BPE-20 (manufactured by Shin Nakamura Chemical Co., Ltd.), NK ESTER A-BPE-30 (manufactured by Shin Nakamura Chemical Co., Ltd.), bisphenol A-modified epoxy di(meth)acrylate, EBECRYL 3700 (manufactured by Daicel Cytec Co., Ltd.), and EBECRYL 3701 (manufactured by Daicel Cytec Co., Ltd.).

Examples of the monomer having ion bridging between molecules include zinc (meth)acrylate.

In addition, if the crosslinking density is too high, cracks are generated at the time of molding, and if the crosslinking density is too low, integration of protrusions occurs. Therefore, in order to adjust the crosslinking density to an optimal range, the mass average molecular weight of the monomer (Y') according to the present invention is from 300 to 8000, preferably from 350 to 5000, and most preferably from 400 to 3500.

(Toughness)

Furthermore, toughness of the microrelief structural body is also important. Toughness according to the present invention is an indicator indicating whether it is possible for the microrelief structural body to conform to the die without having cracks generated in the microrelief structural body at the time of press molding or at the time of injection molding. For the microrelief structural body, it is preferable that the toughness determined in a tensile test at 80° C. is from 1 $kJ/m^2$ to 20 $kJ/m^2$.

In the case of insert molding described above, a decorative sheet that has been molded to a predetermined shape by pre-molding, that is, vacuum molding in advance, is disposed inside a die, subsequently a molten resin is injected to be filled in the die, and at the same time, the molten resin is integrated with the decorative sheet. The decorative sheet is generally pre-molded to be slightly smaller than the die for obtaining a final molded body. The die for injection molding is usually temperature-regulated to about 60° C. to 120° C.; however, when the decorative sheet is disposed inside this die, the decorative sheet acquires a temperature that is almost equal to that of the die. A molten resin is injected in that state, and due to the injection pressure, the decorative sheet is extended and conforms to the mold shape. At this time, if the decorative sheet does not have sufficient toughness, when the injection pressure of the molten resin is applied, the decorative sheet may have cracks generated therein.

The decorative sheet according to an exemplary embodiment of the present invention preferably includes a sheet base material in addition to the microrelief structural body; however, when such a decorative sheet is used for insert molding, since the sheet base material is usually a thermoplastic polymer, even if the injection pressure of the molten resin is applied, there is almost no chance that cracks are generated in the sheet base material. Therefore, it is preferable that the microrelief structural body of the present invention has higher toughness.

That is, it is preferable that the microrelief structural body contains a cured product having a toughness of from 1 $kJ/mm^2$ to 20 $kJ/mm^2$ as determined by a tensile test at 80° C. Also, the toughness of the cured product as determined by a tensile test at 80° C. is preferably 2 $kJ/m^2$ or more, more preferably 4 $kJ/m^2$ or more, and even more preferably 5 $kJ/m^2$ or more. When the toughness of the cured product as determined by a tensile test at 80° C. is 1 $kJ/m^2$ or more, cracks being generated when the decorative sheet including the microrelief structural body of the present invention is subjected to three-dimensional molding, can be avoided. Furthermore, the toughness at 80° C. of the microrelief structural body of the present invention is more preferably 2 $kJ/mm^2$ to 10 $kJ/mm^2$, even more preferably 4 $kJ/mm^2$ to 8 $kJ/mm^2$, and particularly preferably 5 $kJ/mm^2$ to 8 $kJ/mm^2$.

Figure 1B:
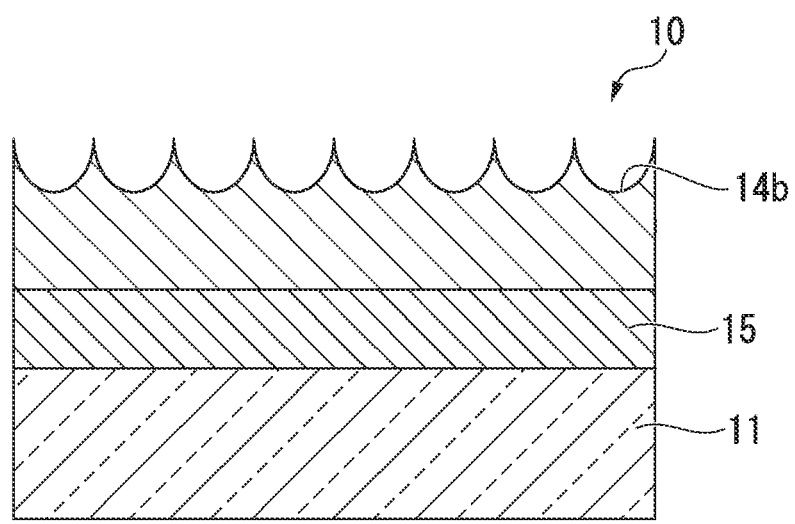
FIG. 1B is a schematic cross-sectional diagram illustrating a microrelief structural body according to an exemplary embodiment of the present invention.

First Embodiment of Microrelief Structural Body Having Physical Properties Described Above An example of the microrelief structural body having the physical properties is the microrelief structural body 10 (that is, microrelief structural layer) including a base material 11 and a cured product 12 having microconcavities 14 on the surface, as illustrated in FIG. 1A and FIG. 1B. The microrelief structural body having the physical properties may also have an intermediate layer 15 illustrated in FIG. 1A and FIG. 1B. That is, the microrelief structural body having the physical properties is, for example, a structural body including a base material and a microrelief structural layer having a microrelief structure, in which the microrelief structural layer is laminated on the base material as a surface layer.

Furthermore, the structural body may also be a structural body including a base material, an intermediate layer, and a microrelief structural layer having a microrelief structure, in which the microrelief structural layer is laminated on the base material as a surface layer of the structural body, with the intermediate layer interposed between the microrelief structural layer and the base material.

(Microrelief Structure)

The microrelief structural body illustrated in FIG. 1A is a structural body in which a cured product 12 of the curable composition related to the present invention on a base material 11.

The surface of the cured product 12 has a microrelief structure. The microrelief structure is, for example, a structure in which inverse conical concavities 14 and convexities 13 are formed at an approximately equal interval $w_1$. Regarding the shape of the concavities, it is preferable that the cross-sectional area in a vertical plane (that is, a plane that runs straight in the height direction of the microrelief structural body) is a shape that continuously increases along the direction from the base material side of the microrelief structural body toward the apex side of the convexities of the microrelief structure, from the viewpoint that the refractive index can be continuously increased, the fluctuation (wavelength dependency) of the reflectance caused by wavelength can be suppressed, scattering of visible light is suppressed, and thereby the reflectance can be decreased.

An embodiment of the present invention has a structure in which plural protrusions having an approximately conical shape or a pyramidal shape (convexities) are arranged, a so-called moth-eye structure, as the microrelief structure. The moth-eye structure in which the interval between concavities is less than or equal to the wavelength of visible light, is known to serve as an effective means for antireflection as the refractive index increases continuously from the refractive index of air to the refractive index of the material.

However, the shape of the microrelief structure is not limited to these, and it is desirable that when the microrelief structural body is cut in a vertical plane (that is, a plane that runs straight in the height direction of the microrelief structural body), the occupancy of the cross-sectional area of convexities increases continuously from the outermost surface side toward the base material side.

Furthermore, it is desirable that the shape is a shape in which the refractive index is increased continuously from air to the surface of the microrelief structural body, and which exhibits antireflection performance that is well-balanced between low reflectance and low wavelength-dependency.

The average interval between the concavities (that is, $w_1$ of FIG. 1A) is less than or equal to the wavelength of visible light, that is, 400 nm or less. When convexities are formed using a mold of anodized alumina that is described below, the average interval between the convexities is about 100 nm. Therefore, the average interval between the concavities is preferably 200 nm or less, and particularly preferably 150 nm or less. Furthermore, from the viewpoint that it is easy to form concavities, the average interval between the low reflectance parts is preferably 20 nm or more. That is, the average interval between the concavities is preferably 20 nm to 400 nm, more preferably 60 nm to 300 nm, and particularly preferably 100 nm to 250 nm. The "average interval between concavities" means a value obtained by measuring the interval between adjacent concavities (distance from the center of a concavity (that is, bottom of the concavity) to the center of an adjacent concavity (that is, bottom of the concavity)) at 10 sites by electron microscopic observation, and averaging these values.

The depth of a concavity (that is, $d_1$ of FIG. 1A) is, when the average interval of the concavities is 100 nm to 300 nm, preferably 80 nm to 500 nm, more preferably 120 nm to 400 nm, even more preferably 150 nm to 300 nm, and particularly preferably 180 nm to 300 nm. When the depth of a concavity is 80 nm or more, the reflectance is sufficiently decreased, while the wavelength-dependency of the reflectance is low.

The "depth of a concavity" is a value obtained by measuring the vertical distance between the bottom of a concavity and the top of a convexity present between concavities, at 10 sites obtained by making an electron microscopic observation at a magnification of 30,000 times, and averaging these values.

The aspect ratio of a concavity (the depth of a concavity/the average interval between concavities) is preferably 0.8 to 5.0, more preferably 1.2 to 4.0, and particularly preferably 1.5 to 3.0. When the aspect ratio of a concavity is 1.0 or more, the reflectance is sufficiently decreased.

Furthermore, the shape of the concavity is preferably a shape in which the cross-sectional area of a convexity or a concavity in a direction that intersects the height direction of the microrelief structural body, continuously increases along the direction from the tip of the convexities of the microrelief structural body toward the base material side. That is, the cross-sectional shape of an arbitrary plane that is parallel to the height direction of the concavities of the microrelief structural body is preferably a triangular shape, a U-shape, or a trapezoidal shape. Meanwhile, in regard to the cross-sectional shape of an arbitrary plane that is parallel to the height direction of the concavities, a shape in which the apex is corner-cut by a straight line or a curved line is also included.

It is preferable that in regard to the shape of a concavity, particularly in a portion close to the top of a convexity existing between concavities, it is preferable that the angle of inclination (that is, in the cross-sectional shape of an arbitrary plane that is parallel to the height direction of the microrelief structural body, the angle formed by the boundary line of convexities and a straight line parallel to the height direction) is larger. If the angle of inclination is large, when the viewing angle is shifted from the front face, the antireflection performance in the case of being observed from an oblique direction is improved. Also, it is preferable that the bottom of a concavity is a curved surface. Even in a case in which the cross-sectional shape of a concavity at an arbitrary plane that is parallel to the height direction of the microrelief structural body is a trapezoidal shape, it is preferable that the bottom of the concavity is a plane which fits into a circle having a diameter of 200 nm. In addition to the reflection between a concavity and a concavity, since reflection can occur even at the bottom of a concavity, the bottom is sufficiently smaller than the wavelength of light.

The concavities may have a bell shape in which the bottom 14b of a concavity is a curved plane as illustrated in FIG. 1B, and in addition to that, a shape in which the cross-sectional area of a concavity in a direction perpendicular to the height direction of the microrelief structural body continuously increases along the direction from the base material side of the microrelief structural body toward the tip side of the convexity, can be employed.

The microrelief structure according to the present invention is not intended to be limited to the embodiments illustrated in FIG. 1A and FIG. 1B, and can be formed on one surface or both surfaces of the base material, or over the entire surface or a portion of the surface of the base material. Furthermore, in order to effectively manifest the water repellency performance, it is preferable that the tip of the bottom of the concavity is fine, and it is preferable that the area occupied by the cured product in a surface of contact between the microrelief structural body and water droplets is as small as possible.

In regard to the microrelief structure related to the present invention, it is preferable that when the shape of a concavity viewed from the above is considered to be a perfect circle, and the concavities are closest packed without overlapping with each other in a hexagonal lattice arrangement, it is preferable that the area of flat portions is 8% to 11%. When the concavities are arranged to overlap with each other, the area of flat portions is decreased. Even if the area of flat portions is 0%, when a SEM observation or the like is conducted, partitions can be observed. However, the partitions that can be observed as such are not limited to have flat tops. When the angle of inclination of the concavities in the area close to the top of the convexities existing between concavities is small, the partitions are thick and can be observed from above. In the case of such a shape, there are occasions in which the antireflection characteristics as observed from the direction of inclination are impaired.

A microrelief structure in which a large number of concavities are arranged as described above is preferred from the viewpoint that even in a case in which the cured product that constitutes the microrelief structure is a flexible cured product having a low elastic modulus, a phenomenon that adjacent convexities are not integrated does not occur.

(Base Material)

The shape of the base material 11 may be any of a sheet shape, a film shape or the like, and regarding the production method, a base material produced by any production method such as, for example, injection molding, extrusion molding, or cast molding, may be used. Furthermore, for the purpose of improving characteristics such as adhesiveness, antistatic properties, scratch resistance, and weather resistance, the surface of the base material 11 (that is, the surface on the opposite side of the surface where the microrelief structural layer is laminated) may be subjected to coating or a corona treatment.

Such a microrelief structural body can be applied as an antireflective film, and high scratch resistance and a contaminant removing effect such as fingerprint removability can be obtained.

Furthermore, an intermediate layer 15 may be provided between the base material 11 and the cured product 12, in order to enhance various physical properties such as scratch resistance and adhesive properties. Examples of the material that forms the intermediate layer 15 include an active energy ray-curable resin composition, a thermoplastic resin, and an inorganic material; however, from the viewpoint of being capable of easily forming a microrelief structure, the intermediate layer 15 is preferably a layer formed from a cured product of an active energy ray-curable resin composition.

Regarding the base material 11, any material may be used as long as it is capable of supporting the cured product 12 having a microrelief structure; however, in a case in which the decorative sheet including a microrelief structural body is molded as a decorative sheet for display members, the base material is preferably a light-transmissive base material, that is, a material that transmits light. Examples of the material that constitutes a light-transmissive base material include synthetic polymers such as a methyl methacrylate (co)polymer, a polycarbonate, a styrene (co)polymer, a methyl methacrylate-styrene copolymer, and a synthetic polymer such as an acrylonitrile-butadiene-styrene copolymer; semi-synthetic polymers such as cellulose diacetate, cellulose triacetate, and cellulose acetate butyrate; polyesters such as polyethylene terephthalate and polylactic acid; polyamide, polyimide, polyether sulfone, polysulfone, polyethylene, polypropylene, polymethylpentene, polyvinyl chloride, polyvinyl acetal, polyether ketone, polyurethane, composites of those polymers (a composite of polymethyl methacrylate and polylactic acid, a composite of polymethyl methacrylate and polyvinyl chloride, and the like), and glass.

In a case in which the decorative sheet is subjected to three-dimensional processing such as insert molding, the base material 11 is preferably a thermoplastic polymer, and for example, an acrylic resin and a polycarbonate resin are preferred. Composites or laminates of these polymers may also be used.

(Curable Composition)

It is preferable that the microrelief structural body 10 is a structural body in which a cured product 12 obtained by curing a curable composition is laminated on a base material as a surface layer of the microstructural body 10, the curable composition including at least one monomer selected from the group consisting of a monomer having one radical polymerizable double bond (hereinafter, also referred to as monofunctional monomer) (X), a monomer having two radical polymerizable double bonds (hereinafter, also referred to as bifunctional monomer) (Y), and a monomer having three or more radical polymerizable double bonds (hereinafter, also referred to as polyfunctional monomer) (Z), in an amount of from 70 parts by mass to 100 parts by mass relative to 100 parts by mass of the curable components in the curable composition, in which composition the monomer having two radical polymerizable double bonds (Y) has a mass average molecular weight of from 600 to 8000, and the value obtained by dividing the mass average molecular weight of the monomer having three or more radical polymerizable double bonds (Z) by the number of polymerizable double bonds of the monomer (Z) is from 300 to 1000.

Furthermore, according to one embodiment of the microrelief structural body 10, there is provided a structural body in which a cured product 12 obtained by curing a curable composition is laminated on a base material as the surface layer of the microstructural body 10, the curable composition including at least one monomer selected from the group consisting of a monomer having one radical polymerizable double bond (X), a monomer having two radical polymerizable double bonds (Y), and a monomer having three or more radical polymerizable double bonds (Z), in an amount of from 70 parts by mass to 100 parts by mass relative to 100 parts by mass of the curable components in the curable composition, in which composition the monomer having two radical polymerizable double bonds (Y) has a mass average molecular weight of from 600 to 8000, and the value obtained by dividing the mass average molecular weight of the monomer having three or more radical polymerizable double bonds (Z) by the number of double bonds of the monomer (Z) is from 300 to 1000.

Meanwhile, the "curable components in the curable composition" as used herein means, for example, components that are cured by irradiation of active energy radiation or the like, and specific examples include a monomer having one radical polymerizable double bond (X), a monomer having two radical polymerizable double bonds (Y), and a monomer having three or more radical polymerizable double bonds (Z).

Furthermore, it is more preferable that the monomer having two radical polymerizable double bonds (Y) is one or more acrylates each having two radical polymerizable double bonds, selected from the group consisting of a urethane di(meth)acrylate having two radical polymerizable double bonds, and a polyether di(meth)acrylate having two radical polymerizable double bonds; the monomer having three or more radical polymerizable double bonds (Z) is one or more acrylate each having three or more radical polymerizable double bonds, selected from the group consisting of a urethane (meth)acrylate having three or more radical polymerizable double bonds, and a polyether (meth)acrylate having three or more radical polymerizable double bonds; and the total amount of the acrylate having two radical polymerizable double bonds and the acrylate having three or more radical polymerizable double bonds is from 30 parts by mass to 80 parts by mass relative to 100 parts by mass of the curable components.

Furthermore, it is preferable that the cured product is a cured product of an active energy ray-curable composition. When a microrelief structural body is formed using the curable composition, the tensile elongation at break of the microrelief structural body can be adjusted to 20% or more.

Also, the curable composition related to the microrelief structural body may include a polymerizable compound in addition to the monomers described above.

Examples of the polymerizable compound include a monomer, an oligomer, and a reactive polymer, all having at least one polymerizable double bond selected from the group consisting of a radical polymerizable bond and a cationic polymerizable bond in the molecule.

Furthermore, the curable composition may also include a non-reactive polymer or an active energy ray sol-gel reactive composition.

Examples of the monomer having one radical polymerizable double bond (X) include alkyl (meth)acrylates such as methyl (meth)acrylate, ethyl (meth)acrylate, n-butyl (meth)acrylate, i-butyl (meth)acrylate, t-butyl (meth)acrylate, lauryl (meth)acrylate, myristyl (meth)acrylate, cetyl (meth)acrylate, stearyl (meth)acrylate, behenyl (meth)acrylate, and 2-ethylhexyl (meth)acrylate; benzyl (meth)acrylate; tetrahydrofurfuryl (meth)acrylate; (meth)acrylates having amino groups, such as dimethylaminoethyl (meth)acrylate and dimethylaminopropyl (meth)acrylate; (meth)acrylates having hydroxyl groups, such as 2-hydroxyethyl (meth)acrylate and hydroxypropyl (meth)acrylate; (meth)acrylamide derivatives such as (meth)acryloylmorpholine and N,N-dimethyl (meth)acrylamide; 2-vinylpyridine; 4-vinylpyridine; N-vinylpyrrolidone; N-vinylformamide; and vinyl acetate. These components may be used singly, or two or more components may be used in combination. Among them, (meth)acryloylmorpholine, 2-hydroxyethyl (meth) acrylate, N,N-dimethyl (meth)acrylamide, N-vinylpyrrolidone, N-vinylformamide, methyl (meth)acrylate, and ethyl (meth)acrylate are preferred because these compounds are not so bulky and can accelerate polymerization reactivity of the curable composition. Furthermore, in the case of using an acrylic film that will be described below as the base material, methyl (meth)acrylate and ethyl (meth)acrylate are particularly preferred. Also, in the case of using a polycarbonate as the base material, compounds having a benzene ring structure, such as benzyl (meth)acrylate, phenoxyethyl (meth)acrylate and phenyl (meth)acrylate, are particularly preferred.

The monomer having two radical polymerizable double bonds (Y) is preferably a monomer having a mass average molecular weight of from 600 to 8000.

According to the present invention, the "mass average molecular weight" means a value obtained using gel permeation chromatography, and calculated relative to polystyrene standards.

Furthermore, it is more preferable to use one or more acrylates having two radical polymerizable double bonds, selected from the group consisting of a urethane (meth) acrylate having two radical polymerizable double bonds and a polyether (meth)acrylate having two radical polymerizable double bonds. Specific examples include polyethylene glycol di(meth)acrylate, polypropylene glycol di(meth)acrylate, polyethylene glycol-propylene glycol di(meth)acrylate, polybutylene glycol di(meth)acrylate, polyethylene glycol-polybutylene glycol di(meth)acrylate, and urethane diacrylate.

Among these, it is particularly preferable to use urethane diacrylate, since this compound decreases the glass transition temperature of the cured product to a large extent, and can maintain high elongation without making the cured product brittle.

"Urethane (meth)acrylate" is a (meth)acrylate which contains at least one urethane structure in an ester residue obtainable by causing an isocyanate compound to react with an alcohol, more preferably a polyol compound, and which is obtained by sealing a (meth)acrylate having hydroxyl groups at the ends of the ester residue, with a (meth)acrylate having an isocyanate group.

Examples of the (meth)acrylate having hydroxyl groups at the ends include 2-hydroxyethyl (meth)acrylate, 2-hydroxypropyl (meth)acrylate, 4-hydroxybutyl (meth)acrylate; and caprolactone-modified monomers, "PLACCEL" series, manufactured by Daicel Corp. Examples of the (meth) acrylate having isocyanate groups at the ends include "KARENZ" series of Showa Denko K.K.

Furthermore, the "polyether (meth)acrylate" is a (meth) acrylate containing a polyol such as polyethylene glycol, polypropylene glycol or polytetramethylene glycol, as the skeleton.

The monomer having three or more radical polymerizable double bonds (Z) is a group having from three to five radical polymerizable double bonds in the molecule. Thereby, the molecular weight between crosslinking points of the cured product of the curable composition is decreased, the cross-linking density is increased, thereby the elastic modulus or hardness of the cured product is increased, and a cured product having excellent scratch resistance can be obtained. A representative example of this group having radical polymerizable double bonds is a (meth)acryloyl group. Furthermore, regarding the monomer having three or more radical polymerizable double bonds (Z), the value obtained by dividing the mass average molecular weight by the number of polymerizable double bonds is from 300 to 1000, and more preferably from 400 to 600.

Examples of such a monomer having three or more radical polymerizable double bonds (Z) that can be used include (meth)acrylates each having three or more radical polymerizable double bonds, such as epoxy (meth)acrylate, polyester (meth)acrylate, urethane (meth)acrylate, and polyether (meth)acrylate.

Among these, it is more preferable that the monomer having three or more radical polymerizable double bonds (Z) is one or more acrylates each having three or more radical polymerizable double bonds, selected from the group consisting of a urethane (meth)acrylate having three or more radical polymerizable double bonds and a polyether (meth) acrylate having three or more radical polymerizable double bonds.

Furthermore, as an additional monomer (H), the curable composition may also include at least one monomer selected from the group consisting of a monomer having a mass average molecular weight of from 150 to 600 and having two radical polymerizable double bonds; and a monomer having three or more radical polymerizable double bonds, whose value obtained by dividing the mass average molecular weight by the number of groups having a polymerizable double bond is from 70 to 300.

Specific examples of the monomer having a mass average molecular weight of 600 or less and having two radical polymerizable double bonds include 1,4-butanediol di(meth)acrylate, 1,6-hexanediol di(meth)acrylate, 1,9-nonanediol di(meth)acrylate, 1,10-decanediol di(meth)acrylate, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth) acrylate, tetrapropylene glycol di(meth)acrylate, bisphenol A di(meth)acrylate, ethoxylated bisphenol A di(meth)acrylate, propoxylated bisphenol A di(meth)acrylate, and pentaerythritol di(meth)acrylate epoxy diacrylate. These may be used singly or in combination of two or more kinds thereof.

Specific examples of the monomer having three or more radical polymerizable double bonds, whose value obtained by dividing the mass average molecular weight by the number of polymerizable double bonds is 300 or less, include trimethylolpropane tri(meth)acrylate, glycerin tri (meth)acrylate, pentaerythritol tri(meth)acrylate, pentaerythritol tetra(meth)acrylate, ditrimethylolpropane tetra (meth)acrylate, dipentaerythritol penta(meth)acrylate, dipentaerythritol hexa(meth)acrylate, and ethoxy-modification products or propoxy-modification products thereof. These may be used singly, or in combination of two or more kinds thereof.

Furthermore, examples of commercially available products include ATM-4E of the "NK ESTER" series manufactured by Shin Nakamura Chemical Co., Ltd.; DPEA-12 of "KAYARAD" series manufactured by Nippon Kayaku Co., Ltd.; M-305, M-450, M-400, and M-405 of "ARONIX" series manufactured by Toagosei Co., Ltd.; and "EBECRYL 40" manufactured by Daicel Cytec Co., Ltd. (all trade names).

Among these, from the viewpoint of adhesiveness to the base material, monomers having small molecular weights, such as 1,4-butanediol di(meth)acrylate, 1,6-hexanediol di(meth)acrylate, ethylene glycol di(meth)acrylate, diethylene glycol di(meth)acrylate, propylene glycol di(meth)acrylate and dipropylene glycol di(meth)acrylate, are preferred. As a reference, it is preferable to use a monomer having a mass average molecular weight of 300 or less, and more preferably a mass average molecular weight of 250 or less, from the viewpoint of adhesiveness to the base material.

The content of the monomer having one radical polymerizable double bond (X) relative to 100 parts by mass of the curable components in the curable composition is preferably from 1 part by mass to 80 parts by mass, more preferably from 3 parts by mass to 60 parts by mass, even more preferably from 3 parts by mass to 40 parts by mass, and particularly preferably from 5 parts by mass to 20 parts by mass. Also, the content is preferably 10 parts to 50 parts by mass, more preferably 15 parts to 40 parts by mass, and particularly preferably 20 parts to 30 parts by mass. When the content of the monomer having one radical polymerizable double bond (X) is in the range described above, it is preferable because unreacted monomer does not remain in the cured product, and foul odor can be suppressed.

Furthermore, the total content of the monomer having two radical polymerizable double bonds (Y) and the monomer having three or more radical polymerizable double bonds (Z), that is, (Y)+(Z), is preferably 10 parts to 90 parts by mass, more preferably 20 parts to 80 parts by mass, and particularly preferably 40 parts to 60 parts by mass, relative to 100 parts by mass of the curable components in the curable composition. When the total content of the monomer having two radical polymerizable double bonds (Y) and the monomer having three or more radical polymerizable double bonds (Z) is in the range described above, it is preferable from the viewpoint that contraction of the cured product 12 occurs to a less extent, and warpage does not occur easily.

Also, from the viewpoint of adhesiveness, it is also preferable to use the aforementioned additional monomer (H) having a small mass average molecular weight; however, having a small mass average molecular weight is synonymous with having an increased crosslinking density. Therefore, when the composition includes an additional monomer (H) Having a mass average molecular weight of 300 or less, the content of the additional monomer (H) is preferably 30 parts by mass or less relative to 100 parts by mass of the curable components in the curable composition, from the viewpoint of maintaining the tensile elongation at break of the microrelief structural body at 20% or more; however, from the viewpoint of adhesiveness, it is preferable to use the additional monomer (H) in an amount of 10 parts by mass or more, and more preferably 20 parts by mass or more.

That is, the content of the additional monomer (H) is preferably from 10 parts by mass to 30 parts by mass, and more preferably from 20 parts by mass to 25 parts by mass, relative to 100 parts by mass of the curable components in the curable composition.

When the above-described curable composition including at least one monomer selected from the group consisting of a monomer having one radical polymerizable double bond (X), a monomer having two radical polymerizable double bonds (Y), and a monomer having three or more radical polymerizable double bonds (Z), in an amount of 70 parts by mass or more relative to 100 parts by mass of the curable components in the curable composition, is used, it is preferable because the microrelief structural body can have sufficient tensile elongation at break. Furthermore, it is more preferable that the curable composition includes at least one monomer selected from the group consisting of a monomer having one radical polymerizable double bond (X), a monomer having two radical polymerizable double bonds (Y), and a monomer having three or more radical polymerizable double bonds (Z), in an amount of 80 parts by mass or more relative to 100 parts by mass of the curable components in the curable composition.

On the other hand, when the monomers described above are included in an amount of 70 parts by mass or more relative to 100 parts by mass of the curable components in the curable composition, the content of the monomer having three or more radical polymerizable double bonds, which has an extremely high crosslinking density, that is, having a very small value that is obtainable by dividing the mass average molecular weight by the number of polymerizable double bonds, specifically, having a value that is obtainable by dividing the mass average molecular weight by the number of polymerizable double bonds, of 150 or less, and particularly 120 or less, is preferably 0 parts to 20 parts by mass, more preferably 0 parts to 10 parts by mass, and particularly preferably 0 parts to 5 parts by mass, relative to 100 parts by mass of the curable components in the curable composition. When the content of the monomer having an extremely high crosslinking density and having three or more radical polymerizable double bonds is in the range described above, it is preferable because the tensile elongation at break of the cured product can be maintained at 20% or more.

Furthermore, it is preferable for the curable composition of the present invention that the monomer having two radical polymerizable double bonds (Y) is one or more acrylates each having two radical polymerizable double bonds, selected from the group consisting of a urethane (meth)acrylate having two radical polymerizable double bonds and a polyether (meth)acrylate having two radical polymerizable double bonds; the monomer having three or more radical polymerizable double bonds (Z) is one or more acrylates each having three or more radical polymerizable double bonds, selected from the group consisting of a urethane (meth)acrylate having three or more radical polymerizable double bonds and a polyether (meth)acrylate having three or more radical polymerizable double bonds; and the total amount of the acrylate having two radical polymerizable double bonds and the acrylate having three or more radical polymerizable double bonds is 30 parts by mass or more relative to 100 parts by mass of the curable components in the curable composition. When the total amount of the acrylate having two radical polymerizable double bonds and the acrylate having three or more radical polymerizable double bonds is 30 parts by mass or more relative to 100 parts by mass of the curable components in the curable composition, it is preferable from the viewpoint that cracks are not easily generated at the time of three-dimensional molding. Also, when the monomer having two radical polymerizable double bonds (Y) and the monomer having three or more radical polymerizable double bonds (Z) are urethane (meth)acrylates or polyether (meth)acrylates, it is preferable because the toughness of the cured resin is increased.

(Other Inclusions)

It is preferable that the curable composition includes an active energy radiation polymerization initiator. This active energy radiation polymerization initiator is a compound which is cleaved by irradiation of active energy radiation, and generates a radical that initiates a polymerization reaction. The "active energy radiation" means, for example, an electron beam, ultraviolet radiation, visible light, plasma, or a thermal radiation such as infrared radiation. Particularly, it is preferable to use ultraviolet radiation from the viewpoint of the facility cost or productivity.

Specific examples of the active energy radiation polymerization initiator include benzophenone, 4,4-bis(diethylamino)benzophenone, 2,4,6-trimethylbenzophenone, methyl ortho-benzoylbenzoate, 4-phenylbenzophenone, t-butylanthraquinone, 2-ethylanthraquinone; thioxanthones such as 2,4-diethylthioxanthone, isopropylthioxanthone, and 2,4-dichlorothioxanthone; acetophenones such as diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one, and 2-benzyl-2-dimethylamino-1-(4-morpholinophenyl)-butanone; benzoin ethers such as benzoin methyl ether, benzoin ethyl ether, benzoin isopropyl ether, and benzoin isobutyl ether; acylphosphine oxides such as 2,4,6-trimethylbenzoyldiphenylphosphine oxide, bis(2,6-dimethoxybenzoyl)-2,4,4-trimethylpentylphosphine oxide, and bis(2,4,6-trimethylbenzoyl)phenylphosphine oxide; methylbenzoyl formate, 1,7-bisacridinylheptane, and 9-phenylacridine. These may be used singly, or in combination of two or more kinds thereof. Particularly, it is preferable to use two or more components having different absorption wavelengths. Also, if necessary, a thermal polymerization initiator such as a persulfuric acid salt such as potassium persulfate or ammonium persulfate; a peroxide such as benzoyl peroxide; or an azo-based initiator may also be used in combination.

Regarding the content of the active energy radiation polymerization initiator, when the total amount of the contents of all the monomers included in the curable composition is designated as 100 parts by mass, the content of the initiator is preferably 0.01 parts to 10 parts by mass, more preferably 0.1 parts to 5 parts by mass, and particularly preferably 0.2 parts to 3 parts by mass, relative to 100 parts by mass of the total amount. When the content is adjusted to 0.01 parts by mass or more, it is preferable because the curable composition has excellent curability, and the mechanical characteristics, particularly scratch resistance, of the cured product are improved. Also, when the content is adjusted to 10 parts by mass or less, the decrease in elastic modulus and scratch resistance caused by any residual polymerization initiator remaining in the cured product, or coloration can be suppressed.

The curable composition may include at least one component selected from the group consisting of an active energy radiation absorber and an oxidation inhibitor. The active energy radiation absorber is preferably a compound which can absorb the active energy radiation irradiated at the time of curing of the curable composition, and can suppress deterioration of the cured product.

Examples of the active energy radiation absorber include a benzophenone-based ultraviolet absorber, a benzotriazole-based ultraviolet absorber, and a benzoate-based ultraviolet absorber. Examples of commercially available products thereof include 400 and 479 of "TINUVIN (registered trademark)" series manufactured by BASF Japan, Ltd.; and 110 of "VIOSORB (registered trademark)" series manufactured by Kyodo Chemical Co., Ltd.

Examples of the oxidation inhibitor include a phenolic oxidation inhibitor, a phosphorus-based oxidation inhibitor, a sulfur-based oxidation inhibitor, and a hindered amine-based oxidation inhibitor. Examples of commercially available products thereof include "IRGANOX (registered trademark)" series manufactured by BASF Japan, Ltd. Regarding these active energy radiation absorbers and oxidation inhibitors, one kind of component may be used alone, or two or more kinds of components may be used in combination.

Regarding the content of at least one component selected from the group consisting of an active energy radiation absorber and an oxidation inhibitor, when the total amount of the contents of all the monomers included in the curable composition is designated as 100 parts by mass, the content is preferably 0.01 parts to 5 parts by mass, more preferably 0.01 parts to 1 part by mass, and particularly preferably 0.01 parts to 0.5 parts by mass, relative to 100 parts by mass of the total amount. When the content is adjusted to 0.01 parts by mass or more, yellowing of the cured product or an increase in the haze value can be suppressed, and weather resistance can be enhanced. When the content is adjusted to 5 parts by mass or less, curability of the curable composition, scratch resistance of the cured product, and adhesiveness of the cured product to the base material can be improved.

The curable composition may include, if necessary, additives such as a mold release agent, a lubricating agent, a plasticizer, an antistatic agent, a photostabilizer, a flame retardant, a flame retardant aid, a polymerization inhibitor, a filler, a silane coupling agent, a colorant, a reinforcing agent, an inorganic filler, and an impact resistance modifier, to the extent that does not inhibit the functions of the monomer having one radical polymerizable double bond (X), the monomer having two radical polymerizable double bonds (Y), and the monomer having three or more radical polymerizable double bonds (Z).

A lubricating agent and a slip agent are compounds that exist on the surface of the resin cured product, reduce friction at the surface, and enhance scratch resistance. Examples of commercially available products of the slip agent include "SH3746FLUID" and "FZ-77" manufactured by Dow Corning Toray Co., Ltd.; "KF-355A" and "KF-6011" manufactured by Shin-Etsu Chemical Co., Ltd. (all trade names). These may be used singly or in combination of two or more kinds thereof.

Regarding the content of the slip agent, when the total amount of the contents of all the monomers included in the curable composition is designated as 100 parts by mass, the content is preferably 0.01 parts to 5 parts by mass, and more preferably 0.1 parts to 2 parts by mass, relative to 100 parts by mass of the total amount.

When the content is adjusted to 0.01 parts by mass or more, the curable composition has excellent curability, and the mechanical characteristics, particularly scratch resistance, of the cured product are improved. When the content is adjusted to 5 parts by mass or less, the decrease in the elastic modulus and scratch resistance caused by any residual slip agent remaining in the cured product, or coloration can be suppressed.

Furthermore, the curable composition may include a solvent; however, it is preferable that the curable composition does not include any solvent.

In a case in which a solvent is not included, for example, in the process in which the curable composition is polymerized and cured by being irradiated with active energy radiation in a state of being poured into a template, and then is released from the mold, there is no risk of having the solvent remaining in the cured product. Also, when the production process is considered, investment for facilities for solvent removal is unnecessary, and it is also preferable in view of cost.

When the curable composition includes a solvent, examples of the solvent include toluene, xylene, acetone, ethyl acetate, butyl acetate, and methyl ethyl ketone.

The content of the solvent is preferably 1% to 50% by mass.

(Physical Properties of Curable Composition)

In regard to the viscosity of the curable composition, when a microrelief structure is formed using a mold and cured, the viscosity at 25° C. of this curable composition as measured with a B type rotary viscometer is preferably from 10 mPa·s to 10,000 mPa·s, more preferably from 20 mPa·s to 5000 mPa·s, and particularly preferably from 30 mPa·s to 2000 mPa·s. Furthermore, even in a case in which this viscosity is more than 10,000 mPa·s, when a curable composition having the viscosity adjusted to the aforementioned range by heating is used, workability is not impaired. Furthermore, the viscosity of this curable composition measured with a B type rotary viscometer at 70° C. is preferably from 1 mPa·s to 5000 mPa·s, and more preferably from 2 mPa·s to 2000 mPa·s.

The viscosity of the curable composition can be adjusted by regulating the kind or content of the monomer. Specifically, when a large amount of a monomer containing a functional group having intermolecular interaction such as hydrogen bonding (for example, a urethane bond) or such a chemical structure (for example, a group having π-π interaction or ion bridging, specifically a structure having a bisphenol skeleton or a metal salt) is used, the viscosity of the curable composition is increased. Also, when a large amount of a monomer having a low molecular weight (for example, a molecular weight of 50 to 200) and having no intermolecular interaction is used, the viscosity of the curable composition is decreased.

Figure 5A:
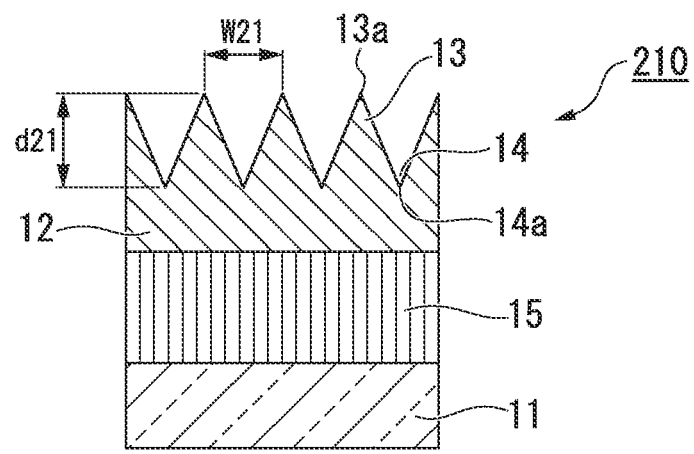
FIG. 5A is a schematic cross-sectional diagram illustrating a microrelief structural body according to an exemplary embodiment of the present invention.
Figure 5B:
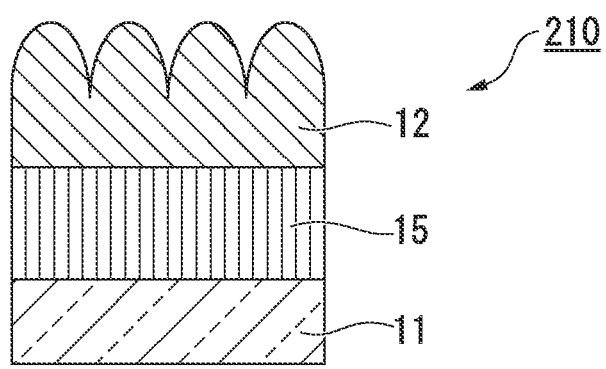
FIG. 5B is a schematic cross-sectional diagram illustrating a microrelief structural body according to an exemplary embodiment of the present invention.

Second Embodiment of Microrelief Structural Body Having Physical Properties Described Above An example of the microrelief structural body having the physical properties described above is a microrelief structural body 10 in which a cured product 12 of the curable composition according to the present invention is laminated on a base material 11, with a below-described intermediate layer 15 interposed therebetween, as illustrated in FIG. 5A and FIG. 5B.

That is, an example of the microrelief structural body having the physical properties is a structural body including a base material, an intermediate layer, and a microrelief structural layer having a microrelief structure, in which the microrelief structural layer is laminated on the base material as a surface layer of the structural body, with the intermediate layer interposed there between.

(Microrelief Structure)

The surface of the cured product 12 has a microrelief structure. The microrelief structure is formed such that, for example, conically shaped convexities 13 and concavities 14 are formed at an approximately equal interval $w_{21}$. Regarding the shape of the convexities, any shape in which the cross-sectional area in a vertical plane (that is, a plane that runs straight in the height direction of the microrelief structural body) continuously increases along the direction from the apex side of a convexity toward the base material side of the microrelief structural body, is preferable because the refractive index can be continuously increased, any fluctuation in the reflectance caused by wavelength (wavelength-dependency) is suppressed, and scattering of visible light is suppressed to lower the reflectance.

The average interval between convexities (that is, the average value of $w_{21}$ in FIG. 5A) (or average interval between concavities) is adjusted to a distance less than or equal to the wavelength of visible light (380 to 780 nm). When the average interval $w_{21}$ of convexities is 300 nm or less, scattering of visible light can be suppressed, and the microrelief structural body can be suitably used in optical applications as an antireflective film.

Furthermore, the height of a convexity or the depth of a concavity (that is, the average value of the vertical distance $d_{21}$ between the bottom point 14a of a concavity and the top point 13a of a convexity in FIG. 5A) is preferably adjusted to a distance by which fluctuation of the reflectance caused by wavelength can be suppressed. The vertical distance $d_{21}$ is specifically preferably from 120 nm to 500 nm, more preferably from 150 nm to 400 nm, and particularly preferably from 180 nm to 300 nm. When the vertical distance $d_{21}$ is near 150 nm (that is, 150 nm±20 nm), the reflectance of light in the wavelength range of 550 nm that can be most easily perceived by a human being) can be minimized. When the vertical distance $d_{21}$ is 150 nm or more, as the height of the convexities (vertical distance $d_{21}$) is higher, the difference between the maximum reflectance and the minimum reflectance in the visible light range becomes smaller. For this reason, when the vertical distance $d_{21}$ is 150 nm or more, the wavelength dependency of reflected light is decreased, and the color difference is not recognized by visual inspection.

The aspect ratio (height of convexities/average interval of convexities) of the microrelief structural body is preferably 0.6 to 1.5.

When the average interval $w_{21}$ of the convexities is 300 nm, if the height $d_{21}$ of the convexities is 180 nm, sufficient antireflection performance can be obtained. The aspect ratio in this case is 0.6.

When the average interval $w_{21}$ of the convexities is 120 nm, if the height $d_{21}$ of the convexities is 180 nm, sufficient antireflection performance can be obtained. The aspect ratio in this case is 1.5.

When the aspect ratio is 1.5 or less, the phenomenon that antireflection performance is deteriorated as the convexities draw close together can be easily avoided. When the aspect ratio is 0.6 or more, sufficient antireflection performance can be obtained.

Here, for the average interval between the convexities and the height of the convexities, arithmetic mean values of the measured values obtained by an analysis of images using a field emission type scanning electron microscope (JSM-7400F; manufactured by JEOL, Ltd.) at an accelerating voltage of 3.00 kV, were employed.

Specifically, the "average interval between convexities" is a value obtained by measuring the interval between adjacent convexities (shortest distance from the top of a convexity to the top of an adjacent convexity) at 10 sites by an electron microscopic observation as described above, and averaging these values.

The "height of the convexities" is a value obtained by measuring, at 10 sites, the vertical distance between the bottom of a concavity and the top of a convexity as can be observed by an electron microscopic observation as described above at a magnification of 30,000 times, and averaging these values.

The convexities may have a bell shape in which the apex of the convexity is a curved surface as illustrated in FIG. 5B, and in addition to that, a shape in which the cross-sectional area in a vertical plane (that is, a plane that runs straight in the height direction of the microrelief structural body) continuously increases along the direction from the apex side of the convexities toward the base material side of the microrelief structural body, can be employed.

The microrelief structure is not intended to be limited to the embodiments illustrated in FIG. 5A and FIG. 5B, and can be formed on one surface or both surfaces of the base material, or over the entire surface or in a portion of the surface of the base material. Also, in order to effectively manifest the water-repellent performance, it is preferable that the tips of the protrusions of the convexities are fine, and it is preferable that the area occupied by the cured product in a surface of contact between the microrelief structural body and water droplets is as small as possible. Furthermore, the microrelief structure is not limited to a structure in which protrusions are arranged to stand close together as described above, and similar antireflection effect or the like can still be obtained even with a reverse structure thereof, that is, a structure in which a large number of concavities are arranged in a hexagonal close packed structure.

(Base Material)

The shape of the base material 11 may be any of a sheet form, a film form or the like, and regarding the production method for the base material, a base material produced by any production method such as, for example, injection molding, extrusion molding, or cast molding, may be used. Furthermore, for the purpose of improving characteristics such as adhesiveness, antistatic properties, scratch resistance, and weather resistance, the surface of the base material 11 may be subjected to coating or a corona treatment.

Such a microrelief structural body can be applied as an antireflective film, and high scratch resistance and excellent contaminant removal effect such as fingerprint removability can be obtained.

Furthermore, an intermediate layer 15 may be provided between the base material 11 and the cured product 12, in order to enhance various physical properties such as scratch resistance and adhesive properties. Examples of the material that forms the intermediate layer 15 include an active energy ray-curable resin composition, a thermoplastic resin, and an inorganic material; however, from the viewpoint of being capable of easily forming a microrelief structure, the intermediate layer 15 is preferably a layer formed from a cured product of an active energy ray-curable resin composition.

Regarding the base material 11, any material may be used as long as it is capable of supporting the cured product 12 having a microrelief structure; however, in a case in which the decorative sheet including a microrelief structural body is molded as a decorative sheet for display members, the base material is preferably a light-transmissive base material, that is, a material that transmits light. Regarding the base material 11, the same materials as those mentioned for the base material 11 in the explanation of the first embodiment of the microrelief structural body described above can be used.

(Curable Composition)

The curable composition related to the microrelief structural body is preferably an active energy ray-curable composition.

The curable composition may include curable components such as a monomer having one radical polymerizable double bond (hereinafter, also referred to as monofunctional monomer) (X'), a monomer having two radical polymerizable double bonds (Y') (hereinafter, also referred to as bifunctional monomer), and a monomer having three or more radical polymerizable double bonds (Z') (hereinafter, also referred to as polyfunctional monomer); and a curing agent such as a photopolymerization initiator, or other additives. There are no particular limitations on the curable composition which gives a cured product having an elastic modulus at 25° C. of from 50 MPa to 700 MPa and having an elastic modulus at 80° C. of from 8 MPa to 30 MPa.

In order to adjust the elastic modulus at 25° C. of a cured product of the curable composition to 50 MPa or more, and to adjust the elastic modulus at 80° C. to 30 MPa or less, it is preferable that the total amount of the monomer having one radical polymerizable double bond (X') and the monomer having two radical polymerizable double bonds (Y') occupies from 50 parts by mass to 100 parts by mass, preferably from 60 parts by mass to 100 parts by mass, and more preferably from 70 parts by mass to 100 parts by mass, relative to 100 parts by mass of the curable components in the curable composition. When the monomer having one radical polymerizable double bond (X') and the monomer having two radical polymerizable double bonds (Y') are included in an amount of 50 parts by mass or more relative to 100 parts by mass of the curable components in the curable composition, the crosslinking density becoming excessively high can be avoided, and satisfactory moldability at a high temperature can be obtained.

Furthermore, since a monomer having one radical polymerizable double bond (X') is prone to remain as unreacted monomer when the curable composition is cured instantaneously with active energy radiation such as light, the content of the monomer having one radical polymerizable double bond (X') is preferably from 1 part by mass to 50 parts by mass, more preferably from 5 parts by mass to 40 parts by mass, and particularly preferably from 10 parts by mass to 20 parts by mass, relative to 100 parts by mass of the curable components in the curable composition.

When the content of the monomer having one radical polymerizable double bond (X') is adjusted to 50 parts by mass or less relative to 100 parts by mass of the curable components in the curable composition, unreacted monomer remaining after curing is suppressed, and thereby plasticization of the cured product or the bleed-out of the unreacted monomer over time can be avoided.

Meanwhile, the "curable components in the curable composition" as used herein means components included in the curable composition, which are cured by irradiation of active energy radiation. Specific examples thereof include a monomer having one radical polymerizable double bond (X'); a monomer having two radical polymerizable double bonds (Y'), which has at least one bonding selected from the group consisting of hydrogen bonding, $\pi$-$\pi$ interaction, and ion bridging; a monomer having three or more radical polymerizable double bonds (Z'); and a monomer having two radical polymerizable double bonds other than the monomer (Y').

In order to adjust the elastic modulus at 25° C. of the cured product of the curable composition to 50 MPa or more, and to adjust the elastic modulus at 80° C. to 30 MPa or less, it is preferable to use a monomer having two radical polymerizable double bonds (Y'), which gives a cured product having toughness and a relatively high glass transition temperature.

Furthermore, the mass average molecular weight of the monomer having two radical polymerizable double bonds (Y') is preferably from 300 to 8000, and more preferably from 500 to 5000.

In addition, it is preferable that the monomer having two radical polymerizable double bonds (Y') contains a chemical structure having strong intermolecular interaction, and for example, a monomer having hydrogen bonding, $\pi$-$\pi$ interaction, ion bridging or the like is preferred. Since these kinds of bonding are not covalent bonding, these kinds of bonding constitute dynamic crosslinking points that can freely move about when the bonding force is weakened, and it is known that the bonding force is weakened from in a high temperature range.

Examples of the monomer having hydrogen bonding include monomers having a urethane structure. Specific examples thereof include R-1214, R-1301 and R-1304 of "NEW FRONTIER" series manufactured by Dai-ichi Kogyo Seiyaku Co., Ltd.; and EBECRYL 8402, EBECRYL 8465, EBECRYL 8701, EBECRYL 284, and EBECRYL 8210 of "EBECRYL" series manufactured by Daicel Cytec Co., Ltd.

Examples of the monomer having π-π interaction include monomers having a bisphenol skeleton. Specific examples thereof include A-BPE-4, A-BPE-10, and A-BEP-30 of "NK ESTER" series manufactured by Shin Nakamura Chemical Co., Ltd.; and BPE-4 and BPE-10 of "NEW FRONTIER" series manufactured by Dai-ichi Kogyo Seiyaku Co., Ltd.

Examples of the monomer having ion bridging include monomers in which acid monomers such as zinc acrylate are bridged by metal ions.

It is preferable that the curable composition includes these monomers in an amount of from 20 parts by mass to 90 parts by mass, more preferably 30 parts to 80 parts by mass, and particularly preferably 40 parts to 70 parts by mass, relative to 100 parts by mass of the curable components in the curable composition. When these monomers are included in an amount of 20 parts by mass or more relative to 100 parts by mass of the curable components in the curable composition, a balance can be achieved between high elasticity at room temperature and elongation at a high temperature.

That is, the microrelief structural body is preferably a microrelief structural body which contains a cured product of a curable composition including a monomer having one radical polymerizable double bond (X') and a monomer having two radical polymerizable double bonds (Y'), in which the total amount of the monomer having one radical polymerizable double bond (X') and the monomer having two radical polymerizable double bonds (Y') is from 50 parts by mass to 100 parts b mass relative to 100 parts by mass of the curable components in the curable composition, and the monomer having two radical polymerizable double bonds (Y') is a monomer having radical polymerizable double bonds, which has a mass average molecular weight of from 300 to 8000, and has at least one bonding selected from the group consisting of hydrogen bonding, π-π interaction, and ion bridging between the molecules of the monomer having two radical polymerizable double bonds (Y').

In order to process a decorative sheet which includes a sheet having on the surface a microrelief structural body formed from a cured product of the curable composition, by three-dimensional molding, it is essential that the cured product of the curable composition of the sheet having a microrelief structural body on the surface sufficiently closely adheres to a base material. In order to enhance the adhesiveness between a base material and the cured product of the curable composition of the sheet having a microrelief structural body on the surface, it is preferable that the curable composition includes a polymerizable component having a small molecular weight.

According to one embodiment of the present invention, it is preferable that the curable composition includes a polymerizable component having a molecular weight of from 50 to 400, and more preferably from 80 to 250, and it is preferable that the curable composition includes, for example, methyl (meth)acrylate, ethyl (meth)acrylate, n-butyl (meth)acrylate, i-butyl (meth)acrylate, t-butyl (meth)acrylate, benzyl (meth)acrylate; monomers each having one radical polymerizable double bonds, such as tetrahydrofurfuryl (meth)acrylate, 2-hydroxyethyl (meth)acrylate, hydroxypropyl (meth)acrylate, (meth)acryloylmorpholine, N,N-dimethyl (meth)acrylamide, 2-vinylpyridine, 4-vinylpyridine, N-vinylpyrrolidone, N-vinylformamide, and vinyl acetate; and monomers each having two radical polymerizable double bonds, such as 1,4-butanediol di(meth)acrylate, 1,6-hexanediol di(meth)acrylate, diethylene glycol di(meth)acrylate, triethylene glycol di(meth)acrylate, tetraethylene glycol di(meth)acrylate, dipropylene glycol di(meth)acrylate, and tripropylene glycol di(meth)acrylate.

It is preferable that the curable composition includes these low molecular weight monomers in an amount of from 20 parts by mass to 60 parts by mass, more preferably from 30 parts by mass to 55 parts by mass, and even more preferably from 40 parts by mass to 55 parts by mass, relative to 100 parts by mass of the curable components in the curable composition. When the low molecular weight monomer is included in an amount of 20 parts by mass or more, satisfactory adhesiveness can be imparted to the cured product of the curable composition and a base material, and at the time of three-dimensional molding, the occurrence of a defective appearance caused by detachment and separation of the cured resin layer (cured product of the curable composition) from the base material, can be suppressed.

According to one embodiment of the present invention, examples of the monomer having two radical polymerizable double bonds (Y') include polyether di(meth)acrylates such as 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, tricyclodecane dimethanol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, polyethylene glycol-propylene glycol di(meth)acrylate, polybutylene glycol di(meth)acrylate, and polyethylene glycol-polybutylene glycol di(meth)acrylate; epoxy di(meth)acrylates such as ethoxylated bisphenol A di(meth)acrylate and propoxylated bisphenol A di(meth)acrylate; and urethane diacrylate.

According to an embodiment of the present invention, examples of the monomer having three or more radical polymerizable double bonds (Z') include trimethylolpropane tri(meth)acrylate, glycerin tri(meth)acrylate, pentaerythritol tri(meth)acrylate, pentaerythritol tetra(meth)acrylate, ditrimethylolpropane tetra(meth)acrylate, dipentaerythritol penta(meth)acrylate, dipentaerythritol hexa (meth)acrylate, and ethoxy-modification products or propoxy-modification products thereof.

According to one embodiment of the present invention, in addition to, or in replacement of, the monomer having three or more radical polymerizable double bonds (Z'), a trifunctional or higher-functional (meth)acrylate such as epoxy (meth)acrylate, polyester (meth)acrylate, urethane (meth)acrylate, or polyether (meth)acrylate can be used.

(Other Inclusions)

It is preferable that the curable composition includes an active energy radiation polymerization initiator. Regarding this active energy radiation polymerization initiator, the same compounds as the active energy radiation polymerization initiators mentioned in the explanation of the first embodiment of the microrelief structural body described above can be used.

Furthermore, the content of this active energy radiation polymerization initiator is the same as the content of the active energy radiation polymerization initiator mentioned in the explanation of the first embodiment of the microrelief structural body described above.

The curable composition may include at least one component selected from the group consisting of an active energy radiation absorber and an oxidation inhibitor. The active energy radiation absorber is preferably a compound which can absorb the active energy radiation irradiated at the time of curing of the curable composition, and can suppress deterioration of the cured product.

Examples of the active energy radiation absorber and the oxidation inhibitor include the same compounds as the active energy radiation absorbers and oxidation inhibitors mentioned in the explanation of the first embodiment of the microrelief structural body described above.

Furthermore, the content of at least one component selected from the group consisting of the active energy radiation absorber and the oxidation inhibitor is the same as the "content of at least one component selected from the group consisting of an active energy radiation absorber and the oxidation inhibitor" mentioned in the explanation of the first embodiment of the microrelief structural body described above.

The curable composition may also include, if necessary, additives such as a mold release agent, a lubricating agent, a plasticizer, an antistatic agent, a photostabilizer, a flame retardant, a flame retardant aid, a polymerization inhibitor, a filler, a silane coupling agent, a colorant, a reinforcing agent, an inorganic filler, and an impact resistance modifier, to the extent that the functions of the monomer having one radical polymerizable double bond, the monomer having two radical polymerizable double bonds, and the monomer having three or more radical polymerizable double bonds are not impaired.

A lubricating agent and a slip agent are compounds that exist on the surface of the cured product, reduce friction at the surface, and enhance scratch resistance. Examples of commercially available products of the slip agent are the same as the commercially available products of the slip agent mentioned in the explanation of the first embodiment of the microrelief structural body described above. Also, the content of the slip agent is the same as the content of the slip agent mentioned in the explanation of the first embodiment of the microrelief structural body described above.

Furthermore, the curable composition may include a solvent; however, it is preferable that the curable composition does not include any solvent. In a case in which a solvent is not included, for example, in the process in which the curable composition is polymerized and cured by being irradiated with active energy radiation in a state of being poured into a template, and then is released from the mold, there is no risk of having the solvent remaining in the cured product. Also, when the production process is considered, investment for facilities for solvent removal is unnecessary, and it is also preferable in view of cost.

(Physical Properties of Curable Composition)

In a case in which the curable composition is processed by three-dimensional molding into a very complicated shape, particularly a deeply drawn shape, the material used therein is required to have high tensile elongation at break. Therefore, it is preferable to have higher tensile elongation at break in the molding temperature region for the material used. On the other hand, if the tensile elongation at break is too high, the microrelief structure may be damaged, or the optical performance may be impaired. Therefore, the tensile elongation at break in the molding temperature region for the cured product of the curable composition is preferably an elongation of 10% or more, more preferably an elongation of 15% to 100%, even more preferably an elongation of 20% to 80%, and particularly preferably an elongation of 20% to 50%.

<Method for Producing Microrelief Structural Body>

Examples of the method for producing a microrelief structural body having the physical properties described above include (1) a method of disposing the curable composition between a mold in which a reverse structure of the microrelief structure related to the present invention is formed on the surface, that is, the surface of the mold having a microrelief structure, and a base material, curing the curable composition by irradiation of active energy radiation, transferring the concavo-convex shapes of the mold to the cured product of the curable composition, and then detaching the mold; and (2) a method of transferring the microrelief shape of the mold to the curable composition, subsequently detaching the mold, and then irradiating the curable composition with active energy radiation to cure the curable composition. Among these, from the viewpoints of transferability of the microrelief structure and the degree of freedom of the surface composition, method (1) is particularly preferred. This method is a method that is particularly suitable in the case of using a belt-shaped or roll-shaped mold capable of continuous production, and has excellent productivity.

The method for forming a reverse structure of a microrelief structure on a mold is not particularly limited, and specific examples thereof include an electron beam lithography method and a laser light interference method. For example, a mold having a microrelief structural formed thereon is obtained by applying an appropriate photoresist film is applied on an appropriate supporting substrate, exposing the photoresist film to light such as ultraviolet laser light, an electron beam, or X-radiation, and developing the photoresist film, and this mold can be directly used as a mold. Furthermore, a microrelief structure can also be formed directly on a supporting substrate itself, by selectively etching the supporting substrate by dry etching, with a photoresist layer interposed therebetween, and removing the resist layer.

Furthermore, anodized porous alumina can also be used as a mold. For example, a porous structure having fine pores having a size of 20 nm to 200 nm, which is formed by anodizing aluminum at a predetermined voltage using oxalic acid, sulfuric acid, phosphoric acid or the like as an electrolyte liquid, may also be used as a mold.

According to this method, when high purity aluminum is anodized at a positive voltage for a long time, subsequently an oxide film is first removed, and the aluminum is anodized again, fine pores with very high regularity can be formed in a self-organizing manner.

Furthermore, by combining an anodization treatment and a pore size expansion treatment in the second anodization process, a microrelief structure in which a cross-sectional shape cut in an arbitrary plane that is horizontal in the height direction of the microrelief structural body is not spherical but is triangular or bell-shaped, can also be formed. Furthermore, the angle of the deepest part of the pores can be made sharper by appropriately regulating the time or conditions of the anodization treatment and the pore size expansion treatment.

Furthermore, a replica form is produced from a prototype having a microrelief structure by an electroforming method, and this may be used as a mold.

The shape of the mold itself is not particularly limited, and for example, the shape may be any of a flat plate shape, a belt shape, or a roll shape. Particularly, when a belt shape or a roll shape is employed, a microrelief structure can be transferred continuously to the mold, and thus productivity can be increased.

The curable composition is disposed between such a mold and a base material. An example of the method of disposing a curable composition between a mold and a base material is a method of pressing a mold and a base in a state in which the curable composition between the mold and the base material, and thereby injecting the curable composition into a molding cavity.

Regarding the method of polymerizing and curing a curable composition between a base material and a mold by irradiating the curable composition with active energy radiation, polymerization and curing induced by ultraviolet irradiation is preferred. Regarding the lamp that irradiates ultraviolet radiation, for example, a high pressure mercury lamp, a metal halide lamp, and a fusion lamp can be used.

The amount of irradiation of ultraviolet radiation may be determined according to the absorption wavelength or content of the polymerization initiator. Usually, the cumulative amount of light is preferably 400 mJ/cm$^2$ to 4000 mJ/cm$^2$, and more preferably 400 mJ/cm$^2$ to 2000 mJ/cm$^2$. When the cumulative amount of light is 400 mJ/cm$^2$ or more, the curable composition is sufficiently cured, so that the decrease in scratch resistance caused by insufficient curing can be suppressed. Also, when the cumulative amount of light is 4000 mJ/cm$^2$ or less, it is preferable because coloration of the cured product or deterioration of the base material can be prevented. The intensity of irradiation is not particularly limited; however, it is preferable to suppress the output power to a level that does not cause deterioration of the base material or the like.

After polymerization and curing, the mold is detached, thereby a cured product having a microrelief structure is obtained, and thus a microrelief structural body is obtained.

Furthermore, in a case in which the base material is a molded body having a three-dimensional shape or the like, the microrelief structural body thus formed may also be affixed to a molded body having a three-dimensional shape that has been separately molded.

The microrelief structural body obtainable in this manner has the microconvexity structure of the mold transferred to the surface of the structural body in a key and key-hole relationship, so that the microrelief structural body has high scratch resistance, also has water-repellency, and can manifest excellent antireflection performance by means of continuous change in the refractive index. Thus, the microrelief structural body is suitable as a film, or as an antireflective film for molded bodies having three-dimensional shapes.

<Decorative Sheet>

It is preferable that the decorative sheet according to an exemplary embodiment of the present invention includes a microrelief structural body having a microrelief structure on the surface, the microrelief structural body containing a cured product of a curable composition, and having at least one physical property selected from the group consisting of the following: the tensile elongation at break of the cured product is 20% or more, and the cured product has an elastic modulus at 25° C. of 50 MPa or more and an elastic modulus at 80° C. of 30 MPa or less. When three-dimensional molding is performed using this decorative sheet, antireflection performance can be imparted to the surface of a molded body having a complicated shape, which is difficult in the prior art technologies.

That is, an example of the decorative sheet according to an exemplary embodiment of the present invention is a decorative sheet having a microstructural body having a microstructure in the surface layer on a base material sheet, in which the microrelief structural body contains a cured product of a curable composition, and has at least one physical property selected from the group consisting of the following: the tensile elongation at break of the cured product is 20% or more, and the cured product has an elastic modulus at 25° C. of 50 MPa or more and an elastic modulus at 80° C. or 30 MPa or less.

The decorative sheet according to an exemplary embodiment of the present invention is preferably a sheet having a microrelief structural body which contains a cured product of a curable composition and has the physical properties described above, at least on one surface of a sheet base material.

Figure 2:
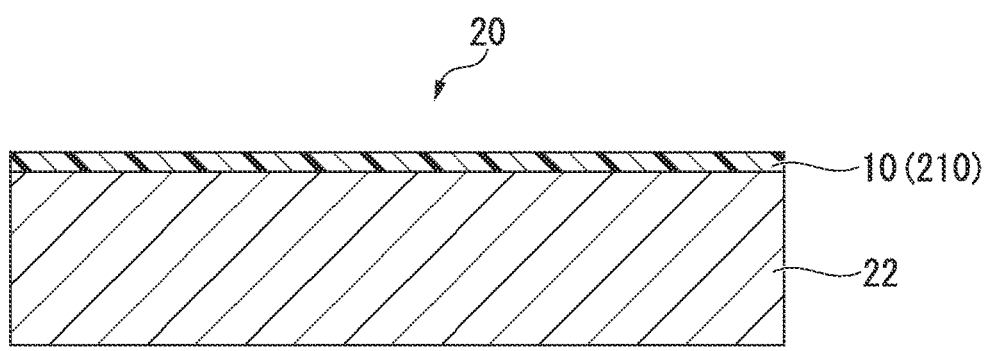
FIG. 2 is a schematic cross-sectional diagram illustrating a decorative sheet according to an exemplary embodiment of the present invention.

FIG. 2 is a cross-sectional diagram illustrating an example of the decorative sheet according to an exemplary embodiment of the present invention. The decorative sheet 20 has a sheet base material 22, and the microrelief structural body 10 that is formed on the surface of the sheet base material 22. The microrelief structural body 10 (or 210) has microconvexities and microconcavities (not shown in the diagram) formed on the surface. The microrelief structural body 10 (or 210) is intended to play the role as a cured resin film, and the thickness is preferably 1 µm to 50 µm, more preferably 1 µm to 10 µm, and even more preferably 2 µm to 8 µm.

The "thickness" as used herein means a value obtained by measuring the average value of the thicknesses at any 10 sites of the decorative sheet 20 and the average value of the thicknesses at any 10 sites of the sheet base material 22 respectively using a micrometer, and subtracting the average value of the thickness of the sheet base material 22 from the average value of the thickness of the decorative sheet 20. Also, the value of thickness may also be determined by subtracting the thickness of the sheet base material 22 from the thickness of the decorative sheet 20 in a cut surface obtainable when the decorative sheet 20 is cut in an arbitrary plane parallel to the height direction.

Furthermore, the difference between the refractive index of the microrelief structural body 10 (or 210) and the refractive index of the sheet base material 22 is preferably 0.2 or less, more preferably 0.1 or less, and particularly preferably 0.05 or less. When the difference in the refractive index between the microrelief structural body 10 (or 210) and the sheet base material 22 is 0.2 or less, it is preferable because reflection at the interface between the microrelief structural body 10 and the sheet base material 22 is suppressed.

(Sheet Base Material)

When the decorative sheet of the present invention is molded for a use as a display member, it is preferable that the sheet base material 22 is a light-transmissive base material, that is, a material that transmits light. Examples of the material for the sheet base material 22 include an acrylic resin, a polycarbonate resin, a styrene-based resin, a polyester resin, a cellulose-based resin (triacetyl cellulose or the like), a polyolefin resin, an alicyclic polyolefin resin, an acrylonitrile-butadiene-styrene copolymer resin (ABS resin), a polyvinylidene fluoride resin (PVDF resin), and a vinyl chloride resin.

Among them, a sheet base material containing at least one resin selected from the group consisting of an acrylic resin, a polyester resin, a polycarbonate resin, a styrene-based resin, an acrylonitrile-butadiene-styrene copolymer resin (ABS resin), a polyvinylidene fluoride resin (PVDF resin), a vinyl chloride resin, and composites of these resins; and a sheet base material containing at least one resin selected from the group consisting of an acrylic resin, a polyester resin, a polycarbonate resin, an acrylonitrile-butadiene-styrene copolymer resin (ABS resin), a polyvinylidene fluoride resin (PVDF resin), a vinyl chloride resin, and composites of these resins. From the viewpoint of having excellent light transmissivity and weather resistance, an acrylic resin is particularly preferred.

That is, the sheet according to the present invention may be a sheet including a resin sheet base material containing at least one resin selected from the group consisting of an acrylic resin, a polyester resin, a polycarbonate resin, an acrylonitrile-butadiene-styrene copolymer resin (ABS resin), a polyvinylidene fluoride resin (PVDF resin), a vinyl chloride resin, and composites of these resins; and the microrelief structural body laminated on at least one surface of the resin sheet base material.

Regarding the acrylic resin as a material for the sheet base material, from the viewpoint of having scratch resistance, pencil hardness, heat resistance, and chemical resistance, the acrylic resins described in JP 8-323934 A, JP 11-147237 A, JP 2002-80678 A, JP 2002-80679 A, JP 8-323934 A, JP 11-147237 A, JP 2002-80678 A, JP 2002-80679 A, and JP 2005-97351 are preferred. Furthermore, from the viewpoint of the resistance to whitening during molding when insert molding (in-mold molding) is performed, the acrylic resins described in JP 2005-163003 A and JP 2005-139416 A are preferred.

The sheet base material 22 may also include known additives (a stabilizer, an oxidation inhibitor, a lubricating agent, a processing aid, a plasticizer, an impact resistance agent, an anti-shock agent, a filler, an antibacterial agent, an antifungal agent, a mold release agent, an antistatic agent, an ultraviolet absorber, a photostabilizer, a thermal stabilizer, and a flame retardant).

The thickness of the sheet base material 22 is preferably 10 µm to 500 µm, more preferably 30 µm to 400 µm, and particularly preferably 50 µm to 300 µm. When the thickness of the sheet base material 22 is 500 µm or less, a rigidity appropriate for insert molding (in-mold molding) is obtained, and a film can be produced stably. When the thickness of the sheet base material 22 is 10 µm or more, a more sufficient feeling of depth can be imparted to the insert molded body, together with protectiveness for the base material.

The sheet base material 22 may also be a laminate film or a laminate sheet.

Examples of the method for producing a sheet base material 22 include known methods such as a melt extrusion method (melt flow casting method, a T-die method, and an inflation method), and a calendering method, and from the viewpoint of economic efficiency, a T-die method is preferred. Also, in the case of producing the sheet base material 22 by a T-die method, it is preferable to use a method of sandwiching the material of the sheet base material 22 between plural rolls (metal rolls and the like) or belts (metal belts and the like), and forming a film, from the viewpoint of enhancing surface smoothness.

(Other Layers)

The decorative sheet according to an exemplary embodiment of the present invention may further include, in addition to the sheet, other layers such as a thermoplastic resin layer, a decorative layer, an adhesive layer, and a primer layer.

The thermoplastic resin layer is, for example, a layer that serves as a base material when a decorative layer is formed. Examples of the material for the thermoplastic resin include an acrylic resin, a polycarbonate, a styrene resin, a polyester, a cellulose-based resin (triacetyl cellulose or the like), a polyolefin, and an alicyclic polyolefin.

It is preferable that the decorative layer is on the surface of the sheet base material 22 that is on the opposite side of the microrelief structural body 10, and in a case in which the decorative layer has a thermoplastic resin layer, it is preferable that the decorative layer is present between the sheet base material 22 and the thermoplastic resin layer. Examples of the decorative layer include a printed layer formed by a printing method, and a deposited layer formed by a vapor deposit method.

The printed layer constitutes designs, patterns, characters, and the like in an insert-molded body. Examples of printed patterns include wood texture, stone texture, cloth texture, sand texture, geometric patterns characters, and all-solid pattern.

Examples of the method for forming a printed layer include an offset printing method, a gravure rotary printing method, a screen printing method, a roll coating method, a spray coating method, and a flexographic printing method. The thickness of the printed layer is usually preferably about 0.5 µm to 30 µm.

Furthermore, the printed layer can also be used as a masking layer. A masking layer is formed by a conventional printing method such as gravure printing, or a conventional coating method such as gravure coating, gravure reverse coating, gravure offset coating, spinner coating, roll coating, or reverse roll coating. Preferably, it is preferable that the masking layer is formed by applying the layer by gravure coating, and drying or curing the layer.

A deposited layer is formed of any one of metals (aluminum, nickel, gold, platinum, chromium, iron, copper, indium, tin, silver, titanium, lead, zinc, and the like), alloys thereof, or compounds thereof. Examples of the method for forming a deposited layer include methods such as a vacuum deposition method, a sputtering method, an ion plating method, and a plating method.

It is preferable that a primer layer or an adhesive layer is formed on the outermost layer of the decorative sheet on the opposite side of the microrelief structural body 10 (or 210). The adhesive layer is formed by a conventional coating method such as gravure coating, gravure reverse coating, gravure offset coating, spinner coating, roll coating, reverse roll coating, kiss coating, whirler coating, dip coating, solid coating based on silk screen printing, wire bar coating, flow coating, comma coating, drain coating, brush coating, or spray coating; or a transfer coating method.

It is preferable to use a thermoplastic resin or a curable resin for the adhesive layer. Examples of the thermoplastic resin include an acrylic resin, an acryl-modified polyolefin resin, a chlorinated polyolefin resin, a vinyl chloride-vinyl acetate copolymer, a thermoplastic urethane resin, a thermoplastic polyester resin, a polyamide resin, and a rubber-based resin, and these can be used singly or as mixtures of two or more kinds thereof. Furthermore, as the thermosetting resin, it is preferable to use a urethane resin or an epoxy resin.

The difference between the refractive index of the adhesive layer and the refractive index of an adjacent layer, that is, the decorative layer or the sheet base material 22, is preferably 0.2 or less, more preferably 0.1 or less, and particularly preferably 0.05 or less. When the difference in the refractive index between the adhesive layer and an adjacent layer is 0.2 or less, reflection at the interface between the adhesive layer and the adjacent layer is suppressed.

The thickness of the adhesive layer is usually preferably about 1 to 5 µm.

<Method for Producing Decorative Sheet>

The formation of the microrelief structural body is as described above. On the other hand, regarding the method for producing the decorative sheet related to an exemplary embodiment of the present invention, the decorative sheet can be obtained by preparing the curable composition described above, applying this on a sheet base material, and crosslinking and curing the curable composition in a state of being covered with a mold having a microrelief structure. In the case of curing the curable composition with ultraviolet radiation, a high pressure mercury lamp, a low pressure mercury lamp, a metal halide lamp, a fusion lamp, a carbon arc lamp, or the like is used.

The microrelief structural body may also be adhered to a sheet base material using an adhesive or the like so as to form a laminate.

The microrelief structural body may be formed after providing a design layer or an adhesive layer on the back surface of the sheet base material, or a microrelief structural body may be formed first, and then a functional layer may be provided on the back surface.

The decorative sheet according to an exemplary embodiment of the present invention can be used in various injection molding methods such as an insert molding method, an injection molding and simultaneous decorating method, a blow molding method, and a gas injection molding method, and the decorative sheet can be suitably used in an insert molding method and an injection molding and simultaneous decorating method. Meanwhile, in the injection molding and simultaneous decorating method, since the decorative sheet is subjected to heat and pressure caused by the resin material, the decorative sheet is close to a flat plate, and when the decorative sheet undergoes less contraction, the decorative sheet may not be preheated. Meanwhile, regarding the resin material used herein, the same resin materials as those used for the insert molding method can be used.

<Decorative Resin Molded Body>

The decorative resin molded body according to an exemplary embodiment of the present invention has a molding base material formed of a resin material; and the decorative sheet of the present invention, in which the surface of the opposite side of the side where the microrelief structure has been formed is in contact with the molding base material.

That is, the decorative resin molded body according to an exemplary embodiment of the present invention includes a molding base material formed of a resin material; and a decorative sheet, in which the decorative sheet is in contact with the molding base material at the surface of the opposite side of the surface where the microrelief structure of the decorative sheet has been formed.

When it is intended to decorate a resin molded body with a designed pattern or the like, a method of subjecting the resin molded body directly to printing can be used; however, in a case in which the number of patterns is large, it is inefficient, and the cost increases. Therefore, a method of transferring the design of a decorative sheet that has been subjected to printing in advance to the resin molded body, or a method of integrally molding a decorative sheet that has been subjected to printing and a resin molded body, and thereby applying the design to the molded body, is employed.

Particularly, since the decorative resin molded body according to an exemplary embodiment of the present invention has a microrelief structure on the surface, reflection of light at the surface is suppressed, reflected light disappears, and thereby the color tone becomes clearer. In the case of black color, particularly the effect is significant, and piano black, which is a high quality design, can be easily manifested.

The molded base material formed of a resin material may be colored with a colorant (a pigment, a dye, or the like), or may have printing, coating or the like applied on the surface.

(Resin Material)

Examples of the resin material for the molded base material of the decorative resin molded body according to the present invention include olefin-based resins (polyethylene, polypropylene, polybutene, polymethylpentene, an ethylene-propylene copolymer, an ethylene-propylene-butene copolymer, or an olefin-based thermoplastic elastomer), a styrene-based resin, an ABS resin (acrylonitrile-butadiene-styrene copolymer), an AS resin (acrylonitrile-styrene copolymer), an acrylic resin, a urethane-based resin, an unsaturated polyester resin, an epoxy resin, a polyphenylene oxide-polystyrene-based resin, a polycarbonate, a polyacetal, a polycarbonate-modified polyphenylene ether, polyethylene terephthalate, polysulfone, polyphenylene sulfide, polyphenylene oxide, polyetherimide, polyimide, a liquid crystalline polyester, a heat-resistant polyallyl-based resin, various composite resins, and various modified resins.

The resin material may contain a colorant (a pigment, a dye or the like). Also, the resin material may contain known additives (a stabilizer, an oxidation inhibitor, a lubricating agent, a processing aid, a plasticizer, an anti-shock agent, a foaming agent, a filler, an antibacterial agent, an antifungal agent, a mold release agent, an antistatic agent, an ultraviolet absorber, a photostabilizer, a thermal stabilizer, a flame retardant, and the like).

The decorative resin molded body of the present invention can be suitably used for members for vehicles, members for displays, electronic products, and the like. Specifically, the decorative resin molded body according to an exemplary embodiment can be used after being attached to the surfaces of members for interior and exterior decoration, internal members for optical products, optical lenses, members for electrical products, packaging containers, and miscellaneous goods.

Examples of the members for interior and exterior decoration include members for automobile interior decoration (instrument panels, console boxes, meter covers, door lock bezels, steering wheels, power windows, switch bases, center clusters, dashboards, and the like), members for automobile exterior decoration (weather strips, bumpers, bumper guides, side mud guards, body panels, spoilers, front grills, strut mounts, wheel caps, center fillers, door mirrors, center ornaments, side moldings, door moldings, window moldings, windows, headlamp covers, tail lamp covers, windshield parts, and the like), and members for interior and exterior decoration of various transport vehicles other than automobiles (electric trains, aircrafts, ships, and the like).

Examples of the inner members for optical products include all optical instruments that require the removal of unnecessary light, such as lens barrels for optical products (cameras and the like); projection type display devices such as front projectors and rear projectors; multi-vision systems including a plural number of the projection type display devices; image capturing devices such as digital cameras and video cameras; optical pickup devices; and optical fiber communication systems.

Examples of the optical lenses include lenses made of resins, such as pickup lenses, lenses for cameras, and spectacle lenses.

Examples of the members for electrical products include housings, buttons, and switches.

Examples of the packaging containers include bottles, cosmetic containers, and accessory cases.

Examples of the miscellaneous goods include gifts and small articles.

<Method for Producing Decorative Resin Molded Body>

The decorative resin molded body of the present invention (hereinafter, simply referred to as "molded body") can be produced by, for example, the following production methods (I) to (V). The molding temperature for the decorative resin molded body may vary depending on the shape of the molded body or the resin material used; however, usually a reference molding temperature may be 80° C. to 160° C. In a case in which the decorative resin molded body is produced using a resin material which is sufficiently stretched at room temperature, it is generally easier to stretch the resin material at a higher temperature.

(I) Method for producing a decorative resin molded body, the method including a step (A1) of heating the decorative sheet according to an exemplary embodiment of the present invention, pressing the heated decorative sheet against a mold by drawing a vacuum or blowing compressed air, and thereby obtaining a decorative resin molded body having a microrelief structure on the surface (so-called vacuum molding).

That is, the method (I) for producing a decorative resin molded body according to an exemplary embodiment of the present invention is a method for producing a decorative resin molded body including a step (A1) for obtaining a decorative resin molded body, and the step (A1) including producing a decorative resin molded body, including heating the decorative sheet according to an exemplary embodiment of the present invention; and obtaining a decorative resin molded body having a microrelief structure on the surface by pressing the heated decorative sheet against a mold by drawing a vacuum or blowing compressed air.

(II) Method for producing a decorative resin molded body having a microrelief structure on the surface, the method including a step (B1) of pressing a mold against the decorative sheet according to an exemplary embodiment of the present invention while heating the decorative sheet to thereby transfer the mold shape to the decorative sheet, taking out from the mold the decorative sheet as a resultant of transfer of the mold shape, and thereby obtaining a decorative sheet having the mold shape transferred thereto; and a step (B2) of disposing the decorative sheet obtained in the above step (B1) such that the side where a microrelief structure has been formed is brought into contact with the surface of an injection molding die, injecting a resin material in a molten state into the injection molding die, solidifying the resin material, and thereby obtaining a decorative resin molded body having a molded base material formed of a resin material, and a decorative sheet having the surface on the opposite side of the side where the microrelief structure has been formed is in contact with the molded base material (so-called insert molding or in-mold forming).

That is, the method (II) for producing a decorative resin molded body according to an exemplary embodiment of the present invention is a method for producing a decorative resin molded body (so-called insert molding or in-mold forming), the method including:

a step (B1) including pressing a mold against the decorative sheet according to an exemplary embodiment of the present invention while heating the decorative sheet to thereby transfer the mold shape to the decorative sheet, taking out from the mold the decorative sheet as a resultant of transfer of the mold shape, and thereby obtaining a decorative sheet having the mold shape transferred thereto; and a step (B2) including disposing the decorative sheet obtained in the above step (B1) such that the side where a microrelief structure has been formed is brought into contact with the surface of an injection molding die, injecting a resin material in a molten state into the injection molding die, solidifying the resin material, and thereby obtaining a decorative resin molded body having a molded base material formed of the solidified resin material, and the decorative sheet having the surface on the opposite side of the side where the microrelief structure has been formed is in contact with the molded base material.

(III) Method for producing a decorative resin molded body having a microrelief structure on the surface, the method including a step (C1) of disposing the decorative sheet of the present invention such that the side where a microrelief structure has been formed is brought into contact with an injection molding die; and a step (C2) of pressing a mold against the decorative sheet, while heating the decorative sheet inside the injection molding die, so that the decorative sheet conforms to the inner surface of the injection molding die, subsequently clamping the mold, injecting a resin material in a molten state into the die, solidifying the resin material, and thereby obtaining a decorative resin molded body having a molded base material formed of the solidified resin material, and a decorative sheet in which the surface of the opposite side of the side where the microrelief structure has been formed is in contact with the molded base material (so-called in-mold lamination).

That is, the method (III) for producing a decorative resin molded body according to an exemplary embodiment of the present invention is a method for producing a decorative resin molded body (so-called in-mold lamination), the method including:

a step (C1) of disposing the decorative sheet according to an exemplary embodiment of the present invention such that the side where a microrelief structure has been formed is brought into contact with an injection molding die; and a step (C2) including heating the decorative sheet inside the injection molding die, pressing a mold against the decorative sheet so that the decorative sheet conforms to the inner surface of the injection molding die, subsequently clamping the mold, injecting a resin material in a molten state into the die, solidifying the resin material, and thereby obtaining a decorative resin molded body having a molded base material formed of the solidified resin material, and a decorative sheet in which the surface of the opposite side of the side where the microrelief structure has been formed is in contact with the molded base material.

(IV) Method for producing a decorative resin molded body having a microrelief structure on the surface, the method including a step (D1) of pressing a heated mold against the decorative sheet according to an exemplary embodiment of the present invention to thereby transfer the mold shape to the decorative sheet, and obtaining a decorative resin molded body having a microrelief structure on the surface.

That is, the method (IV) for producing a decorative resin molded body according to an exemplary embodiment of the present invention is a method for producing a decorative resin molded body, the method including a step (D1) of pressing a heated mold against the decorative sheet according to an exemplary embodiment of the present invention to thereby transfer the mold shape to the decorative sheet, and obtaining a decorative resin molded body having a microrelief structure on the surface.

(V) Method for producing a decorative resin molded body having a microrelief structure on the surface, the method including a step (E1) of heating the decorative sheet according to an exemplary embodiment of the present invention, pressing a molded article against the decorative sheet, causing the decorative sheet to conform to the shape of the molded article by applying pressure, reducing pressure, or applying pressure and reducing pressure, and thus obtaining a decorative resin molded body having a microrelief structure on the surface of a molded article.

That is, the method (V) for producing a decorative resin molded body according to an exemplary embodiment of the present invention is a method for producing a decorative resin molded body, the method including a step (E1) including heating the decorative sheet according to an exemplary embodiment of the present invention, causing a molded article against the heated decorative sheet, causing the decorative sheet to conform to the shape of the molded article by applying pressure, reducing pressure, or applying pressure and reducing pressure, and obtaining a decorative resin molded body having a microrelief structure on the surface of the molded article.

The method for producing a decorative resin molded body is appropriately selected in consideration of the desired shape of the molded body, productivity, and the like. In general, it is preferable to use a molding method such as the production method (I) or (II) in a case in which the surface unevenness or drawing of the molded body is deep, and it is preferable to use the method (III) that does not need any preliminary molding process in a case in which drawing is shallow. In the method (IV), since the mold itself must be provided with a heating mechanism, it is preferable to use the method (IV) in applications other than the applications intended for mass production.

The method (V) can laminate the decorative sheet on the surface of a molded article by using the molded article itself as a mold.

Production method (I) and step (B1) of production method (II), so-called vacuum molding (hereinafter, also referred to as "preliminary molding") will be explained.

In step (A1) of the production method (I), first, the decorative sheet is heated to the softening temperature. Examples of the method for heating the decorative sheet include a method of providing a heater heated to about 300° C. near the decorative sheet, and heating the decorative sheet with radiant heat; a method of sandwiching both surfaces of the decorative sheet with heated metal plates or the like, and heating the decorative sheet; and a method of bringing a heated metal plate into contact with only one surface of the decorative sheet, and heating the decorative sheet.

Subsequently, a die is pressed against the decorative sheet that has been heated and softened. A method of providing a vacuum suctioning mechanism in the die, suctioning air with a vacuum pump or the like, and thereby causing the decorative sheet to tightly adhere to the die (vacuum suctioning); a method of blowing compressed air from the opposite side of the side where the die is disposed, and thereby pressing the decorative sheet to the mold to adhere to the mold (compressed air pressing); or a method of using vacuum suctioning and compressed air pressing in combination may be used.

After the decorative sheet adheres to the die, the decorative resin molded body that has, on the surface, the decorative sheet having the mold shape transferred thereto is removed from the die.

On the occasion of performing the operation described above, the decorative sheet may be appropriately fixed with a fixing frame or the like. The temperature used when vacuum molding is performed can be appropriately selected according to the resin that forms the sheet base material; however, it is general that vacuum molding is performed at a temperature higher by about 10° C. to 50° C. than the glass transition temperature of the resin that forms the sheet base material.

Step (B1) of the production method (II) is a decorative sheet production process that can include a step similar to that of the production method (I) described above, and is a so-called preliminary molding step.

The decorative sheet obtained in the vacuum molding (step (B1)) described above needs to have a thickness to the extent that can maintain the shape, for the convenience of disposing the decorative sheet inside a die in the subsequent process. Therefore, the thickness of the decorative sheet having the mold shape transferred thereto may vary depending on the resin that forms the sheet base material; however, the thickness is preferably 100 µm to 500 µm.

Furthermore, the method may also include a trimming process after the step (B1).

Figure 4A:
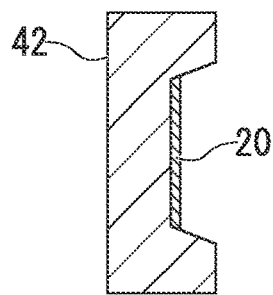
FIG. 4A is a cross-sectional diagram illustrating a part of the process for producing a decorative resin molded body related to an exemplary embodiment of the present invention.
Figure 4B:
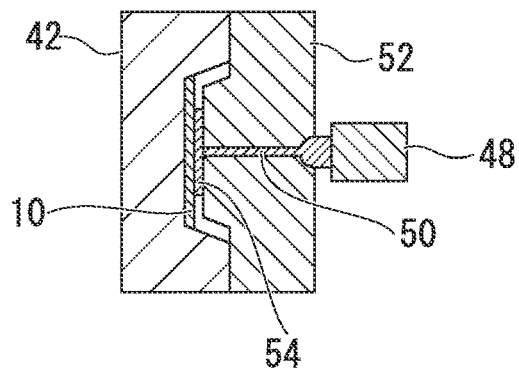
FIG. 4B is a cross-sectional diagram illustrating a part of the process for producing a decorative resin molded body related to an exemplary embodiment of the present invention.
Figure 4C:
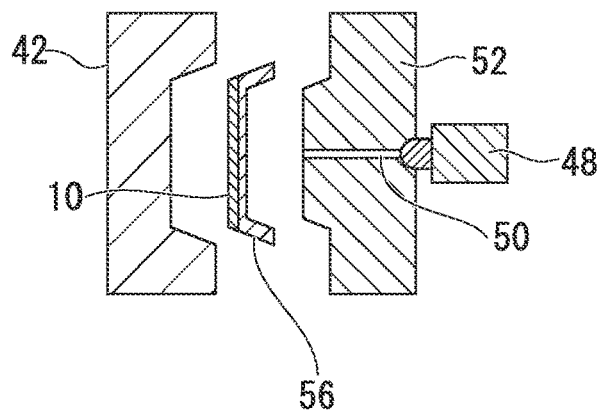
FIG. 4C is a cross-sectional diagram illustrating a part of the process for producing a decorative resin molded body related to an exemplary embodiment of the present invention.

Next, step (B2) of the production method (II) will be explained with reference to FIG. 4A to FIG. 4C.

(i) The decorative sheet 20 is disposed inside a die 42.

(ii) The die 42 and a die 52 provided with a resin gate 50 on the injector 48 side are clamped, and then a heated molten resin material 54 is injected into the mold through the resin gate 50.

(iii) The die 42 and the die 52 are unclamped, and thereby a decorative resin molded body 56 is obtained.

The method of disposing the decorative sheet in the die in (i) may vary depending on the shape of the molded body; however, when a resin material in a molten state is injected, it is necessary to fix the preliminarily molded decorative sheet, that is, the aforementioned decorative sheet having the mold shape transferred thereto (hereinafter, may be referred to as "preliminary molded body") so as to prevent the decorative sheet from shaking. Also, it is general to mold the preliminary molded body to be slightly small, for the convenience of disposing the preliminary molded body inside the die. At the time of injection molding, the decorative sheet may be stretched out and cause distortion in the design or the like. Therefore, the shapes of the preliminary molded body and the die, or the method of disposition thereof can be appropriately selected.

The method of clamping the mold and performing injection molding in (ii) does not require conditions that are significantly different from the general conditions for injection molding. However, in a case in which the preliminary molded body is thin, or in a case in which the thickness of the preliminary molded body is made uneven by preliminary molding, the preliminary molded body may be fractured by the injection pressure of the resin material. Furthermore, cracks may be generated in the microrelief structural body due to the injection pressure of the resin. It is because preliminary molding is carried out in a sufficiently heated state; however, in the case of producing a decorative resin molded body by integrally molding the preliminarily molded body and the resin material, the preliminary molded body can be merely warmed to about the temperature of the die, the preliminary molded body is stretched by the resin material in a state of not being sufficiently softened. From this point of view, it is preferable that the microrelief structural body has high toughness. The size of the gap of the mold, that is, the thickness of the molded body, or the method for providing a resin gate can be appropriately designed in consideration of the desired shape of the molded body, the thickness of the decorative sheet, and the like. The amount of resin supplied, the pressure keeping after injection, and the like are appropriately adjusted without being significantly changed from the general conditions for injection molding. On the occasion of mold clamping and removal of the molded body in (iii), it is preferable that the mold clamping and removal of the molded body are carried out after the cooling time of the molded body is appropriately set similarly to general injection molding. The molding temperature, die temperature, and cooling time are appropriately set depending on the resin material to be injected.

The production method (III) does not change significantly from step (B2) of the production method (II). Generally, the production method includes the following steps.

The production method (III) is a method including a step (C1) of disposing a decorative sheet such that the side where a microrelief structure has been formed is brought into contact with an injection molding die; and a step (C2) of pressing a mold against the decorative sheet while heating the decorative sheet inside the injection molding die so that the decorative sheet conforms to the inner surface of the injection molding die, subsequently clamping the mold, injecting a resin material in a molten state into the mold, solidifying the resin material, and thereby obtaining a decorative resin molded body having a molded base material formed of the solidified resin material, and a decorative sheet in which the surface of the opposite side of the side where the microrelief structure has been formed is in contact with the molded base material.

Specifically, the production method is a production method including a step (C1-1) of feeding a roll-shaped decorative sheet in between open dies; a step (C2-1) of lowering a heating heater, and sufficiently heating and softening the decorative sheet; a step (C2-2) of raising the heating heater, simultaneously vacuum suctioning from the die side to closely adhere the decorative sheet to the die, and thereby molding the decorative sheet; a step of clamping the mold and injecting a resin material in a molten state thereto; and a step (C2-4) of unclamping the mold, cutting (trimming) the decorative resin molded body, and taking out the decorative resin molded body. The decorative sheet may be in a roll form.

Trimming may be carried out before mold clamping, or may be carried out before mold unclamping.

Production method (III) is a method having excellent productivity compared to the production method (II), because a preliminary molding step or a step of disposition inside a die (i) is unnecessary. On the other hand, it is difficult to obtain a molded body having a deeply drawn shape. Also, in the production method (III), a method of supplying a decorative sheet through the rolls provided above the injection molding die is generally used, and therefore, it is preferable that the thickness of the decorative sheet is smaller for the convenience of winding into a roll.

Production method (IV) is similar to the production method (I), but is a method of heating a mold having a shape, without heating the decorative sheet, and pressing the heated mold against the decorative sheet. The production method (IV) is a method similar to impression. In the production method (IV), a decorative sheet is fixed with a frame or the like, and a heated mold is pressed thereupon. Subsequently, the decorative sheet is appropriately cooled in order to release the decorative sheet from the mold, and a molded body is obtained by detaching the mold therefrom.

Production method (V) is similar to the production method (IV); however, the method (V) is so-called overlay molding in which a decorative sheet is heated and pressed against a molded article, and the assembly is thermally laminated, and is a method of using a molded article intended to be integrated, as a so-called mold, and pressing a heated decorative sheet against the molded article. In the production method (V), first, the decorative sheet is fixed with a frame or the like, and the decorative sheet is heated with a heater or the like and softened. The heated decorative sheet is pressed against the molded article, and the molded article is covered with the decorative sheet. Thereafter, pressure is applied on the side where the decorative sheet is not in contact with the molded article, while pressure is reduced on the side where the decorative sheet is in contact with the molded article, and thereby the decorative sheet and the molded article can be closely adhered without having air bubbles trapped therebetween. It is preferable to have a tacky adhesive layer and an adhesive layer on the side of the decorative sheet that is brought into contact with the molded article. Furthermore, the method may also include a step of trimming any surplus portion of the decorative sheet after integration of the decorative sheet with the molded article.

In the methods for producing a decorative resin molded article according to an exemplary embodiment of the present invention described above, since a decorative sheet including a microrelief structural body according to an exemplary embodiment of the present invention is used, even if three-dimensional molding such as described above is carried out, a decorative resin molded body having excellent designability and scratch resistance can be obtained without having decreased antireflection performance.

When three-dimensional molding is performed using a decorative sheet having a microrelief structure on the surface such as described above, the decorative sheet is stretched so as to conform to the shape of the mold. It is common that the decorative sheet is stretched at different stretch ratios in the longitudinal direction and the transverse direction, that is, two axial direction that run straight, of the decorative sheet, depending on the shape of the mold. As a result, even if the microrelief structure of the surface layer is isotropic before molding, the microrelief structure acquires anisotropy in a stretched state after molding. Specifically, when the microrelief structure is observed with a scanning electron microscope or the like, the period of the microrelief structure, that is, the interval between the apexes of adjoining convexities, is different between two axial directions that run straight.

When the microrelief structure has anisotropy, reflection of incident light coming from a particular direction is suppressed, while incident light from a direction that run straight is reflected, and thereby a balance can be achieved between low reflective surface and a peek preventive effect. Furthermore, functions such as polarization cut-off can also be imparted. When an electroconductive filler or the like is added to the resin that forms the microrelief structure, and anisotropy is imparted by stretching, it is also possible to achieve between an antireflection effect and an electromagnetic wave shielding effect.

According to another embodiment of the present invention, there is provided a structural body including a base material and a microrelief structural layer having a microrelief structure, the microrelief structural layer being laminated on the base material as a surface layer of the structural body, and the microrelief structural layer having at least one physical property selected from the group consisting of the following (A) and (B) as well as the following physical property (C):

(A) the elastic modulus at 25° C. is 50 MPa or more, and the elastic modulus at 80° C. is 30 MPa or less;

(B) the tensile elongation at break at 80° C. is from 20% to 100%; and (C) the toughness determined in a tensile test at 80° C. is from 1 kJ/m$^2$ to 20 kJ/m$^2$;

wherein the microrelief structural layer contains a cured product of a curable composition including a monomer having one radical polymerizable double bond (X) and a monomer having two radical polymerizable double bonds (Y), the total amount of the monomer having one radical polymerizable double bond (X) and the monomer having two radical polymerizable double bonds is from 50 parts by mass to 100 parts by mass relative to 100 parts by mass of the curable components in the curable composition, and the monomer having two radical polymerizable double bonds (Y) has a mass average molecular weight of from 300 to 8000, and having at least one bonding selected from the group consisting of hydrogen bonding, π-π interaction, and ion bridging between the molecules of the monomer having two radical polymerizable double bonds (Y).

According to still another embodiment of the present invention, there is provided a structural body, in which the microrelief structural layer has at least one physical property selected from the group consisting of the following (A) and (B), as well as the following physical property (C):

(A) the elastic modulus at 25° C. is 50 MPa or more, and the elastic modulus at 80° C. is 30 MPa or less;

(B) the tensile elongation at break at 80° C. is from 20% to 100%; and (C) the toughness determined in a tensile test at 80° C. is from 1 kJ/m$^2$ to 20 kJ/m$^2$;

the microrelief structural layer contains a cured product obtained by curing a curable composition;

the curable composition includes at least one monomer selected from the group consisting of a monomer having one radical polymerizable double bond (X), a monomer having two radical polymerizable double bonds (Y), and a monomer having three radical polymerizable double bonds (Z);

the total amount of the monomer (X), monomer (Y) and monomer (Z) is from 70 parts by mass to 100 parts by mass relative to 100 parts by mass of the curable components in the curable composition;

the mass average molecular weight of the monomer having two radical polymerizable double bonds (Y) is from 600 to 8000; and the value obtained by dividing the mass average molecular weight of the monomer having three or more radical polymerizable double bonds (Z) by the number of polymerizable double bonds is from 300 to 1000.

EXAMPLES

Hereinafter, the present invention will be specifically described by way of Examples. In the following description, unless particularly stated otherwise, the unit "parts" means "parts by mass". Also, various methods for measurement and evaluation are as follows.

(1) Measurement of Protrusions of Mold:

A mold having a microconvexity structure that was obtained by transfer from a mother mold formed of anodized porous alumina, was subjected to Pt vapor deposition for one minute on a portion of a vertical cross-section, and the cross-section was observed with a field emission type scanning electron microscope (manufactured by JEOL, Ltd., trade name: JSM-7400F) at an accelerating voltage of 3.00 kV. Thus, the interval (period) of adjoining convexities and the height of the convexities were measured. Specifically, measurements were made at 10 sites for each item, and the average value thereof was designated as the measured value.

(2) Measurement of Concavities of Microrelief Structural Body:

A vertical cross-section of a microrelief structural body was subjected to Pt vapor deposition for 10 minutes, and the interval of adjoining concavities and the depth of the concavities were measured using the same apparatus and under the same conditions as in the case of (1). Specifically, measurements were made at 10 sites for each item, and the average value thereof was designated as the measured value.

(3) Tensile Test of Cured Product of Curable Composition that Forms Microrelief Structural Body A dumbbell specimen having a gauge length of 10 mm was punched out from a thin sheet-shaped cured product having a thickness of about 200 μm, and a tensile test was carried out at 80° C. Elongation at break and toughness were calculated.

(4) Visual Inspection of Decorative Sheet (after Stretching Processing)

A decorative sheet obtained by transferring a mold was subjected to a visual inspection in a state of being stretched 20% at 180° C.

Satisfactory: Fine cracks in the microrelief structural body, or separation from the sheet base material is not observed.

Cracking: There are wrinkles and cracks that can be seen by visual inspection.

(5) Evaluation of Reflectance of Decorative Sheet

A decorative sheet obtained by transferring a mold having a microrelief structure was subjected to the measurement of reflectance at the sheet surface in a state of being heated at 180° C., and in a state of being stretched 10% or 20% at 180° C. A sample provided by roughening the surface on the opposite side of the microrelief structure side in the microrelief structural body using sandpaper (GRIT No. 500), and then painting the roughened surface black, was subjected to the measurement of relative reflectance in the wavelength range of 380 to 780 nm under the conditions of an incident angle of 5°, using a spectrophotometer (manufactured by Hitachi, Ltd., U-4100).

(Production of Mother Mold)

Figure 3:
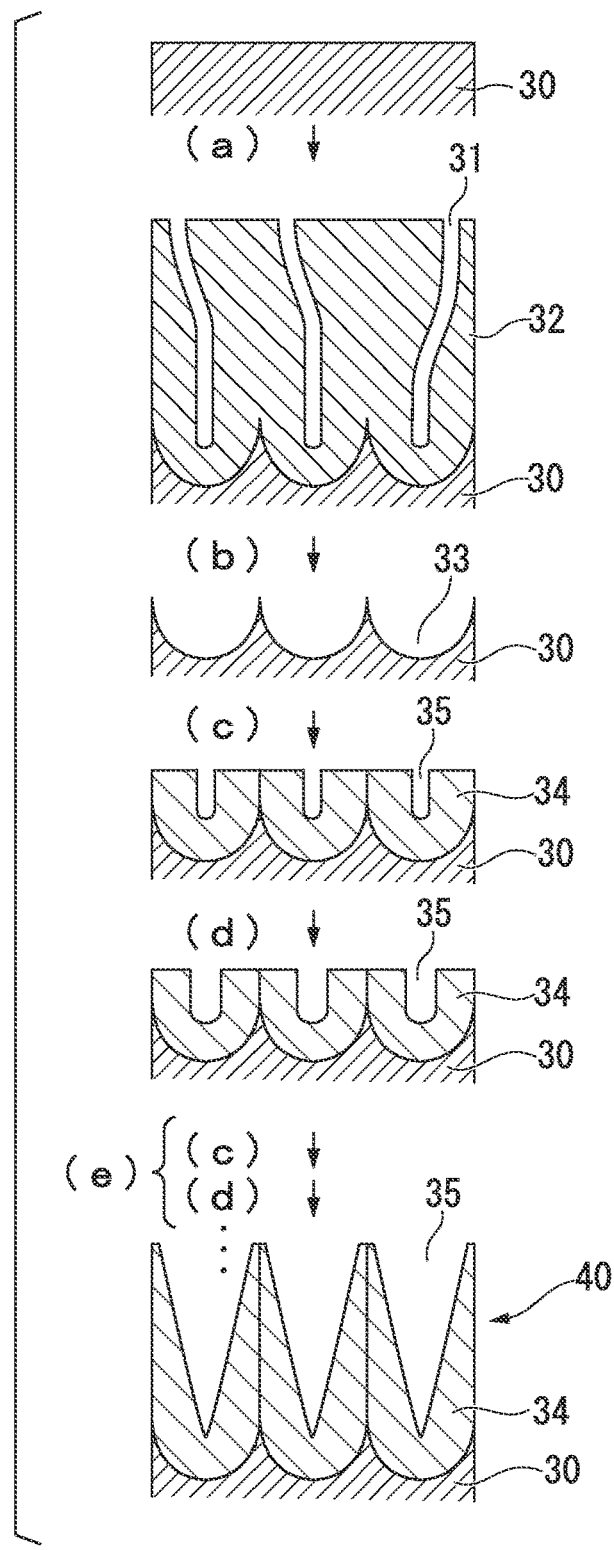
FIG. 3 is a schematic cross-sectional diagram illustrating an example of the process for producing a mold that is used for forming a microrelief structure according to an exemplary embodiment of the present invention.

A mother mold 40 (depth 180 nm) was produced as follows, according to the process illustrated in FIG. 3.

Bulk aluminum having a purity of 99.97% by mass was cut into a roll form having a diameter of 200 mm and a width of 320 mm, and the surface was cut and processed to have a mirror surface. This was used as an aluminum base material 30.

Step (a):

A 0.05 M aqueous solution of oxalic acid was temperature-regulated to 15.7° C., and the aluminum base material 30 was immersed in this solution and was anodized under the following conditions.

While the electric current was controlled such that the current density immediately after the initiation of voltage application would be 19.9 mA/cm$^2$, anodization was initiated at a voltage of 40 V. Anodization was carried out by maintaining the voltage at 40 V for 30 minutes, subsequently the voltage was increased to 80 V, and anodization was carried out at 80 V for 4.5 minutes. Thereby, an oxide film 32 having fine pores 31 was formed.

Step (b):

The aluminum base material 30 having the oxide film 32 formed thereon was immersed in an aqueous solution prepared by mixing 6% by mass of phosphoric acid and 1.8% by mass of chromic acid, at 70° C. for 3 hours to dissolve and remove the oxide film 32. Thus, depressions 33 that served as pore originating points of anodization were exposed.

Step (c):

The aluminum base material 30 with exposed pore originating points was immersed in a 0.05 M aqueous solution of oxalic acid that was temperature-regulated to 15.7° C., and the aluminum base material was anodized at 80 V for 11 seconds. Thus, an oxide film 34 having fine pores 35 was formed again on the surface of the aluminum base material 30.

Step (d):

The aluminum base material 30 having the oxide film 34 formed thereon was immersed for 17 minutes in a 5 mass % aqueous solution of phosphoric acid that had been temperature-regulated to 31.7° C., and thereby the aluminum base material 30 was subjected to a pore size expansion treatment of expanding the fine pores 35 of the oxide film 34.

Step (e):

The step (c) and the step (d) were further repeated alternately four times. The step (d) was carried out at the last. That is, the step (c) was carried out 5 times in total, and the step (d) was carried out 5 times in total.

Thereafter, the aluminum base material was washed with deionized water, and water on the surface was removed by air blowing. Thus, a mold in which oxide film 34 having approximately conically shaped fine pores 35 with an average interval of 180 nm and an average depth of about 180 nm was formed was obtained.

The mold obtained as such was subjected to a mold release treatment by immersing the mold for 10 minutes in an aqueous solution obtained by diluting TDP-8 (manufactured by Nikko Chemicals Co., Ltd.) to 0.1% by mass and air-drying the mold overnight.

(Production of Replica Mold)

A replica mold (height 180 nm) was produced as follows. 85 parts of ethoxylated pentaerythritol tetraacrylate (manufactured by Shin Nakamura Chemical Co., Ltd., trade name: NK ESTER ATM-4E), 8 parts of lauryl acrylate (manufactured by NOF Corp., trade name: BLENMER LA), 7 parts of methyl acrylate, 0.5 parts of 1-hydroxycyclohexyl phenyl ketone (manufactured by BASF Japan, Ltd., trade name: IRGACURE 184) as an active energy radiation polymerization initiator, 1.0 parts of 2,4,6-trimethylbenzoyldiphenylphosphine oxide (manufactured by Ciba-Geigy Japan, Ltd., trade name: DAROCURE TPO), and 0.5 parts of an internal mold release agent (manufactured by Nikko Chemicals Co., Ltd., trade name: NIKKOL TDP-2) were mixed, and thus an active energy ray-curable composition was prepared.

This active energy ray-curable composition was temperature-regulated to 50° C., and the composition was poured onto the pore-formed surface of the mother mold that was temperature-regulated to 50° C. The surface was covered with a polyethylene terephthalate film (manufactured by Mitsubishi Plastics, Inc., trade name: WE97A) having a thickness of 38 μm while the film was extended. Thereafter, the mother mold was irradiated with ultraviolet radiation through the film side using a fusion lamp such that the cumulative amount of light was 1000 mJ/cm$^2$, and thereby the curable composition was cured. Subsequently, the film and the mother mold were detached, and thus a replica mold having a microconvexity structure on the surface was obtained.

On the surface of the replica mold, the concavo-convex structure of the mother mold had been transferred, and an approximately conical-shaped microrelief structure having an interval $w_1$ between adjoining convexities 13 of 180 nm and a height $d_1$ of the convexities 13 of 180 nm as illustrated in FIG. 1A was formed thereon.

Example A1 (Preparation of Curable Composition)

60 parts of urethane acrylate (manufactured by Daicel Cytec Co., Ltd., trade name: EBECRYL 8402), 40 parts of benzyl acrylate, 1.0 part of 1-hydroxycyclohexyl phenyl ketone (manufactured by BASF Japan, Ltd., trade name: IRGACURE 184) as an active energy radiation polymerization initiator, and 0.1 parts of 2,4,6-trimethylbenzoyldiphenylphosphine oxide (manufactured by Ciba-Geigy Japan, Ltd., trade name: DAROCURE TPO) were mixed, and an active energy ray-curable composition was prepared.

(Production of Decorative Sheet)

The active energy ray-curable composition was poured onto the surface of the replica mold where a microrelief structure had been formed, and the surface was covered with a polycarbonate sheet (manufactured by Teijin Co., Ltd., PANLITE PC1151) having a thickness of 500 μm while the sheet was extended. Thereafter, the replica mold was irradiated with ultraviolet radiation through the polycarbonate sheet side using a fusion lamp such that the cumulative amount of light was 1000 mJ/cm$^2$, and thereby the curable composition was cured. Subsequently, the sheet and the replica mold were detached, and thus a decorative sheet including a microrelief structural body having a microrelief structure on the surface was obtained.

On the surface of the microrelief structural body, the microrelief structure of the replica mold had been transferred, and an approximately conical-shaped microrelief structure having an interval $w_1$ between adjoining concavities 14 of 180 nm and a depth $d_1$ of the concavities of 180 nm as illustrated in FIG. 1A was formed thereon. Furthermore, the decorative sheet including this microrelief structural body was evaluated. The results are presented in Table 1.

Examples A2 to A11 and Comparative Examples A1 to A5

Decorative sheets of the same size were produced in the same manner as in Example 1, except that the monomers or initiators were changed as indicated in Table 1, and the decorative sheets were evaluated. The results are presented in Table 1 and Table 2. Meanwhile, the unit for the mixing amounts in the respective tables is "parts".

TABLE 1

| | | Mw | Number of functional groups | Mw/number of functional groups | Example A1 | Example A2 | Example A3 | Example A4 | Example A5 | Example A6 | Example A7 | Example A8 |
|---|---|---|---|---|---|---|---|---|---|---|---|---|
| Monofunctional monomer (X) | X-1 | 162 | 1 | 162 | 40 | 30 | 30 | 20 | 40 | 20 | 20 | 20 |
| | X-2 | 86 | 1 | 86 | | | | | | | | |
| | X-3 | 658 | 1 | 658 | | | | | | | | |
| | X-4 | 116 | 1 | 116 | | | | | | | | |
| Bifunctional monomer (Y) | Y-1 | 1000 | 2 | 500 | 60 | 60 | 50 | 50 | | | | |
| | Y-2 | 698 | 2 | 349 | | | | | | 60 | 30 | 30 |
| | Y-3 | 600 or more | 2 | 300 or more | | | | | 40 | | | |
| Polyfunctional monomer (Z) | Z-1 | 1400 | 3 | 467 | | | | | | | 30 | |
| | Z-2 | 1892 | 4 | 473 | | | | | | | | 30 |
| Other component (H) | H-1 | 226 | 2 | 113 | | 10 | 20 | 30 | 20 | 20 | 20 | 20 |
| | H-2 | 528 | 4 | 132 | | | | | | | | |
| | H-3 | 578 | 6 | 96 | | | | | | | | |
| Polymerization initiator | IRG 184 | | — | — | 1 | 1 | 0.5 | 0.5 | 0.5 | 0.5 | 0.5 | 0.5 |
| | DAR TPO | | — | — | 0.1 | 0.1 | 0.2 | 0.2 | 0.2 | 0.2 | 0.2 | 0.2 |
| Tensile elongation at break of cured resin | | | | (%) | 42.8 | 24.6 | 34 | 28.8 | 21 | 28.6 | 29.4 | 28.6 |
| Toughness upon drawing of cured resin | | | | (kJ/m$^2$) | 2.7 | 1.9 | 5.2 | 4.9 | 2.2 | 5.5 | 6.2 | 5.6 |
| Visual observation of decorative sheet | | | | | Satisfactory | Satisfactory | Satisfactory | Satisfactory | Satisfactory | Satisfactory | Satisfactory | Satisfactory |

TABLE 2

| | | Mw | Number of functional groups | Mw/number of functional groups | Example A9 | Example A10 | Example A11 | Comparative Example A1 | Comparative Example A2 | Comparative Example A3 | Comparative Example A4 | Comparative Example A5 |
|---|---|---|---|---|---|---|---|---|---|---|---|---|
| Monofunctional monomer (X) | X-1 | 162 | 1 | 162 | 30 | 50 | | | | | 40 | |
| | X-2 | 86 | 1 | 86 | | | 10 | | | | | |
| | X-3 | 658 | 1 | 658 | | | | 60 | | 30 | | |
| | X-4 | 116 | 1 | 116 | | | | | | | | 10 |
| Bifunctional monomer (Y) | Y-1 | 1000 | 2 | 500 | | | | | | | | |
| | Y-2 | 698 | 2 | 349 | | 50 | 60 | | 60 | | 20 | 70 |
| | Y-3 | 600 or more | 2 | 300 or more | | | | | | | | |
| Polyfunctional monomer (Z) | Z-1 | 1400 | 3 | 467 | | | | | | | | |
| | Z-2 | 1892 | 4 | 473 | 50 | | | | | | | |
| Other component (H) | H-1 | 226 | 2 | 113 | 20 | | 30 | 40 | 40 | 50 | | |
| | H-2 | 528 | 4 | 132 | | | | | | 20 | 40 | |
| | H-3 | 578 | 6 | 96 | | | | | | | | 20 |
| Polymerization initiator | IRG 184 | | — | — | 0.5 | 0.5 | 0.5 | 1 | 0.5 | 1 | 0.5 | 1.5 |
| | DAR TPO | | — | — | 0.2 | 0.2 | 0.2 | 0.1 | 0.2 | 0.1 | 0.2 | — |
| Tensile elongation at break of cured resin | | | | (%) | 27.6 | 40.4 | 22 | 7.5 | 17.6 | 8 | 13.8 | 13 |
| Toughness upon drawing of cured resin | | | | (kJ/m$^2$) | 5.1 | 3.8 | 4.2 | 0.7 | 5.9 | 1.8 | 2.3 | 3.1 |
| Visual observation after stretching | | | | | Satisfactory | Satisfactory | Satisfactory | Cracking | Cracking | Cracking | Cracking | Cracking |

Abbreviations used in the tables are as described below.

Monomer having one radical polymerizable double bond (X)) •X-1: benzyl acrylate, •X-2: methyl acrylate, •X-3: terminaly methoxylated polyethylene glycol monoacrylate (manufactured by Shin Nakamura Chemical Co., Ltd., trade name: NK ESTER AM130G), •X-4: 2-hydroxyethyl acrylate (monomer having two radical polymerizable double bonds (Y)) •Y-1: urethane (meth)acrylate having two radical polymerizable double bonds (manufactured by Daicel Cytec Co., Ltd., trade name: EBECRYL 8402, Mw=1000), •Y-2: polyethylene glycol diacrylate (manufactured by Toagosei Co., Ltd., trade name: ARONIX M260, Mw=698), •Y-3: urethane di(meth)acrylate having two radical polymerizable double bonds (manufactured by Dai-ichi Kogyo Seiyaku Co., Ltd., trade name: NEW FRONTIER R-1214, Mw=600 or more) (monomer having three radical polymerizable double bonds (Z)) •Z-1: urethane tri(meth)acrylate having three radical polymerizable double bonds (manufactured by Daicel Cytec Co., Ltd., trade name: EBECRYL 8465, Mw=1400, Mw/number of groups having polymerizable double bonds=467), •Z-2: ethoxylated pentaerythritol tetraacrylate (manufactured by Shin Nakamura Chemical Co., Ltd., trade name: NK ESTER ATM-35E, Mw=1892, Mw/number of polymerizable double bonds=473) (additional monomer (H)) •H-1: 1,6-hexanediol diacrylate (monomer having two radical polymerizable double bonds, Mw=226), •H-2: ethoxylated pentaerythritol tetraacrylate (manufactured by Shin Nakamura Chemical Co., Ltd., trade name: NK ESTER ATM-4E, Mw=528, Mw/number of polymerizable double bonds=132), •H-3: dipentaerythritol hexaacrylate (monomer having three or more radical polymerizable double bonds, Mw=578, Mw/number of groups having polymerizable double bonds=96) (polymerization initiator) •"IRG 184": 1-hydroxycyclohexyl phenyl ketone (manufactured by BASF Japan, Ltd., trade name: IRGACURE 184), •"DAR TPO": 2,4,6-trimethylbenzoyldiphenylphosphine oxide (manufactured by Ciba-Geigy Japan, Ltd., trade name: DAROCURE TPO)

As is obvious from the results disclosed in Table 1 and Table 2, the decorative sheets including the microrelief structural body of the present invention of various Examples were produced using curable compositions which exhibited satisfactory elongation, and therefore, no cracks were generated even after 20% stretching.

In Comparative Examples A1 to A4, one or more monomers selected from the group consisting of a monomer having one radical polymerizable double bond (X), a monomer having two radical polymerizable double bonds (Y), and a monomer having three or more radical polymerizable double bonds (Z) of the present invention were not included in an amount of 70 parts by mass or more relative to 100 parts by mass of the curable components in the curable composition, and a monomer whose value obtained by dividing the mass average molecular weight by the number of groups having polymerizable double bonds was 300 or less, was included in an amount of more than 30 parts by mass relative to 100 parts by mass of the curable components in the curable composition. Therefore, the crosslinking densities of the cured products were so high that the cured products could not withstand elongation. In Comparative Example 5, since a monomer having a very high crosslinking density, whose value obtained by dividing Mw by the number of groups having polymerizable double bonds was 100 or less, was used in an amount of 20 parts by mass relative to 100 parts by mass of the curable components in the curable composition, the cured product had low tensile elongation at break, and cracks were generated as a result of stretching.

Samples of the decorative sheets of Comparative Examples 1 to 5 in which cracks had been generated were observed by visual inspection under magnification. The base materials were not damaged by stretching; however, the cured resin films could not withstand elongation and were fractured, so that the cured resin films were separated from the sheet base materials.

Example A12

A decorative sheet of the same size was produced in the same manner as in Example A11, except that the polycarbonate sheet having a thickness of 500 μm was changed to an acrylic film (manufactured by Mitsubishi Rayon Co., Ltd., ACRYPRENE HBK003) having a thickness of 200 μm, and the decorative sheet was evaluated.

The curable composition of Example A11 was adhering satisfactorily even to the acrylic film, and stretching of the curable composition together with the acrylic film was also enabled.

Example A13

The decorative sheet obtained in Example A3 was heated to 180° C. Thereafter, 10% stretching and 20% stretching was carried out at 180° C. using a stretching machine. The surface reflectances of an unstretched sheet, a 10%-stretched sheet, and a 20%-stretched sheet were measured.

In the cases of 10% stretching and 20% stretching, the spectrum curve of reflectance did not change significantly, as compared with the unstretched decorative sheet. The reflectance at 550 nm, at which visibility is considered to be highest, was 0.059, 0.068, and 0.083, respectively, for the unstretched sheet, 10%-stretched sheet, and 20%-stretched sheet.

When the sheets were subjected to further stretching, the reflectance on the longer wavelength side became higher, and it was found that the color tinge of reflected light became more reddish.

(Production of Decorative Resin Molded Body)

Furthermore, integration molding with an acrylic resin was carried out using the decorative sheets thus obtained.

An injection molding die with which a molded body curved in a uniaxial direction at a radius of curvature of 200 mm could be obtained was prepared. A side gate was provided at the center of the curved shape, and the die had a cavity that was curved toward the movable side of the die (the male side (convex surface) of the die was a movable side, and the female side (concave surface) was a fixed side).

On the male side of the die, a decorative sheet including a microrelief structural body was loosely fixed inside the die with a double-sided tape, such that the microrelief structure side of the decorative sheet was brought into contact with the die. Furthermore, the die was temperature-regulated to 60° C. ACRYPET VH001 manufactured by Mitsubishi Rayon Co., Ltd. was used as the resin material. Furthermore, the injection temperature was 250° C.

After injection molding, the mold was unclamped, and the molded body that was fixed to the die by being adhered with a double-sided tape, was taken out. Thus, a decorative resin molded body having a curved surface imparted with antireflection performance, in which the acrylic base material and the resin material were closely adhering to each other, and the microrelief structural body was integrated to the surface of the molded body, could be obtained.

(21) Measurement of Protrusions of Mold, Aspect Ratio:

A stamper formed of anodized porous alumina was subjected to Pt vapor deposition for one minute on a portion of a vertical cross-section, and the cross-section was observed with a field emission type scanning electron microscope (manufactured by JEOL, Ltd., trade name: JSM-7400F) at an accelerating voltage of 3.00 kV. Thus, the interval (period) of adjoining convexities and the height of the convexities were measured. Specifically, measurements were made at 10 sites for each item, and the average value thereof was designated as the measured value.

(22) Measurement of Convexities of Microrelief Structural Body:

A vertical cross-section of a microrelief structural body was subjected to Pt vapor deposition for 10 minutes, and the interval of adjoining convexities and the height of the convexities were measured using the same apparatus and under the same conditions as in the case of (1). Specifically, measurements were made at 10 sites for each item, and the average value thereof was designated as the measured value. Also, the value obtained by dividing the height of a convexity by the interval of convexities was designated as the aspect ratio.

(23) Elastic Modulus and Toughness:

A curable composition was subjected to a tensile test at 25° C. and 80° C. by punching out a dumbbell specimen having a gauge length of 10 mm from a thin sheet-shaped cured product having a thickness of about 200 μm obtained from the curable composition. Thus, the elastic moduli determined in the beginning of stretching at 25° C. and 80°

C., the tensile elongation at break at 80° C., and toughness were calculated. Regarding the elastic modulus, the elastic modulus determined in the beginning of drawing over the tensile strain range of up to 5% was employed. Toughness is a cumulative value of tensile stress until tensile fracture occurs.

(24) Visual Appearance of Decorative Sheet:

A decorative sheet obtained by transferring a mold was observed by visual inspection in a state that no post-processing such as stretching process had been applied.

A: The microrelief structural body exhibits a satisfactory antireflection effect with less wavelength-dependency.

B: White haze was not recognized when the decorative sheet was observed by visual inspection under fluorescent lamp light; however, when intense light was irradiated at an angle of inclination of 45°, the decorative sheet appeared to be covered with white haze.

C: When observed by visual inspection under fluorescent lamp light, the decorative sheet appeared to be covered with white haze.

(5) Adhesiveness Between Base Material Sheet and Cured Product of Curable Composition:

A decorative sheet obtained by transferring a mold was subjected to a peeling test using a tape cross-cut at an interval of 2 mm according to JIS K5400. Adhesiveness was evaluated based on the number of remaining square grids, such that a state in which the cured resin remained on the base material sheet in all of 100 square grids was designated as 100/100, and a state in which the cured resin was completely peeled off by the tape without remaining on the base material sheet was designated as 0/100.

(26) Moldability of Decorative Sheet:

A decorative sheet obtained by transferring a mold was cut to a square that measured 30 mm on each edge, the four corners were fixed, and a dome-shaped mold having a radius of curvature of 200 mm (curvature 20R) and a dome-shaped mold having a radius of curvature of 300 mm (curvature 30R) were pressed against the decorative sheet from the base material sheet side in an environment at 190° C. The external appearance was evaluated by visual inspection.

A: The base material sheet and the microrelief structural body were both satisfactorily stretched, and there was no defect in the external appearance, such as cracks or haze.

B: One or two cracks were generated in the microrelief structural body, and the microrelief structural body was covered with haze.

C: Three or more cracks were generated in the microrelief structural body, or the microrelief structural body was separated from the base material sheet.

[Production of Stamper]

Bulk aluminum having a purity of 99.97% by mass was cut into a roll form having a diameter of 200 mm and a width of 320 mm, and the surface was cut and processed to have a mirror surface. Thereafter, a stamper was produced by the following steps (a) to (e).

Step (a):

An aqueous solution of oxalic acid at 0.05 mol/l was temperature-regulated to 15.7° C., and the aluminum base material was immersed in this solution and was anodized under the following conditions. While the electric current was controlled such that the current density immediately after the initiation of voltage application would be 19.9 mA/cm$^2$, anodization was initiated at a voltage of 40 V. Anodization was carried out by maintaining the voltage at 40 V for 30 minutes, subsequently the voltage was increased to 80 V, and anodization was carried out at 80 V for 4.5 minutes. Thereby, an oxide film having fine pores was formed.

Step (b):

The aluminum base material having the oxide film formed thereon was immersed in an aqueous solution prepared by mixing 6% by mass of phosphoric acid and 1.8% by mass of chromic acid, at 70° C. for 3 hours to dissolve and remove the oxide film. Thus, depressions that served as pore originating points of anodization were exposed.

Step (c):

The aluminum base material with exposed pore originating points was immersed in an aqueous solution of oxalic acid at 0.05 mol/l that was temperature-regulated to 15.7° C., and the aluminum base material was anodized at 80 V for 11 seconds. Thus, an oxide film was formed again on the surface of the aluminum base material.

Step (d):

The aluminum base material having the oxide film formed thereon was immersed for 17 minutes in a 5 mass % aqueous solution of phosphoric acid that had been temperature-regulated to 31.7° C., and thereby the aluminum base material was subjected to a pore size expansion treatment of expanding the fine pores of the oxide film.

Step (e):

The step (c) and the step (d) were further repeated alternately four times. The step (d) was carried out at the last. That is, the step (c) was carried out 5 times in total, and the step (d) was carried out 5 times in total. Thereafter, the aluminum base material was washed with deionized water, and water on the surface was removed by air blowing. Thus, a stamper in which an oxide film having approximately conically shaped fine pores with an average interval of 180 nm and an average depth of about 180 nm was formed was obtained. The stamper obtained as such was subjected to a mold release treatment by immersing the mold for 10 minutes in an aqueous solution obtained by diluting TDP-8 (manufactured by Nikko Chemicals Co., Ltd.) to 0.1% by mass and air-drying the stamper overnight.

Example B1 (Preparation of Active Energy Ray-Curable Composition 21)

40 parts of benzyl acrylate (trade name: "PANCRYL FA-BZA", manufactured by Hitachi Chemical Co., Ltd.), 20 parts of 1,6-hexanediol diacrylate (trade name: "VISCOAT V#230", manufactured by Osaka Organic Chemical Industry, Ltd.), 40 parts of bifunctional urethane acrylate (trade name: "NEW FRONTIER R-1214", manufactured by Dai-ichi Kogyo Seiyaku Co., Ltd.), 0.5 parts of 1-hydroxycyclohexylphenylmethanone (trade name: "IRGACURE 184", manufactured by BASF Japan, Ltd.) as an active energy radiation polymerization initiator, and 0.2 parts of 2,4,6-trimethylbenzoyldiphenylphosphine oxide (trade name: "LUCIRIN TPO", manufactured by BASF Japan, Ltd.) were mixed, and an active energy ray-curable composition 1 (hereinafter, referred to as composition 1) was obtained. A cured product of the composition 1 had a tensile modulus at 25° C. of 500 MPa, a tensile modulus at 80° C. of 11.4 MPa, a tensile elongation at break of 21.0%, and a toughness of 2.2 kJ/m$^2$.

(Formation of Decorative Sheet)

The composition 21 was poured into the porous surface of the stamper, and a polycarbonate sheet (manufactured by Teijin Co., Ltd., PANLITE PC1151) having a thickness of 400 μm was covered thereon as a base material while the sheet was extended. The composition 1 was cured by irradiating the stamper with ultraviolet radiation with energy at 1000 mJ/cm² through the base material side using a fusion lamp. Thereafter, the stamper was detached, and thus a decorative sheet including a microrelief structural body having a microrelief structure on the surface was obtained. The microrelief structure of the stamper was transferred to the surface of the decorative sheet, and an approximately conical-shaped microrelief structure having an interval $w_{21}$ between adjoining convexities 13 of 180 nm and a height $d_{21}$ of the convexities 13 of 180 nm as illustrated in FIG. 5A was formed thereon. The various evaluation results for the decorative sheet thus obtained are presented in Table 3.

Examples B2 to B18 and Comparative Examples B1 to B7

Decorative sheets were produced in the same manner as in Example B1, except that the compositions disclosed in Table 3 and Table 4 were employed. The evaluation results are presented in Table 3. Meanwhile, the unit for the mixing amounts in the respective tables is "parts".

TABLE 3

|  |  | Example B1 | Example B2 | Example B3 | Example B4 | Example B5 | Example B6 | Example B7 | Example B8 | Example B9 | Example B10 | Example B11 | Example B12 | Example B13 |
|---|---|---|---|---|---|---|---|---|---|---|---|---|---|---|
| Monomer (X') | BzA | 40 |  | 10 | 20 |  |  |  | 15 | 14 | 13 |  |  |  |
|  | MA |  |  |  |  |  |  |  |  |  |  |  |  |  |
| Monomer (Y') | R1214 | 40 |  |  |  |  |  |  |  |  |  |  |  |  |
|  | EB8402 |  | 65 | 70 | 50 | 60 | 30 | 50 |  |  |  |  |  |  |
|  | A-BPE-4 |  |  |  |  |  | 40 | 20 | 50 | 45 | 41 | 60 | 55 | 50 |
|  | A-BPE-30 |  |  |  |  |  |  |  | 10 | 9 | 8 | 10 | 9 | 8 |
|  | EB3701 |  |  |  |  |  |  |  |  |  |  |  |  |  |
| Monomer having two radical double bonds other than monomer (Y') | C6DA | 20 | 35 | 20 | 30 | 40 | 30 | 30 | 25 | 23 | 21 | 30 | 27 | 25 |
|  | M260 |  |  |  |  |  |  |  |  |  |  |  |  |  |
| Monomer (Z') | ATM-4E |  |  |  |  |  |  |  |  |  |  |  |  |  |
|  | ATM-35E |  |  |  |  |  |  |  |  |  |  |  |  |  |
|  | EB8465 |  |  |  |  |  |  |  |  |  |  |  |  |  |
|  | EB8701 |  |  |  |  |  |  |  |  |  |  |  |  |  |
|  | UV3570 |  |  |  |  |  |  |  |  | 9 | 17 |  | 9 | 17 |
| Polymerization initiator | IRG 184 | 0.5 | 0.5 | 0.5 | 0.5 | 0.5 | 0.5 | 0.5 | 0.5 | 0.5 | 0.5 | 0.5 | 0.5 | 0.5 |
|  | TPO | 0.2 | 0.2 | 0.2 | 0.2 | 0.2 | 0.2 | 0.2 | 0.2 | 0.2 | 0.2 | 0.2 | 0.2 | 0.2 |
| Aspect ratio of microrelief structural body |  | 1.1 | 1.1 | 1.1 | 1.1 | 1.1 | 1.1 | 1.1 | 1.1 | 1.1 | 1.1 | 1.1 | 1.1 | 1.1 |
| Elastic modulus at 25° C. (MPa) |  | 500 | 110 | 144 | 222 | 315 | 140 | 85 | 110 | 100 | 95 | 110 | 115 | 177 |
| Elastic modulus at 80° C. (MPa) |  | 11.4 | 17.6 | 12.9 | 13.7 | 19.4 | 17.2 | 15.1 | 14.7 | 15 | 14.7 | 18.6 | 18 | 173 |
| Tensile elongation at break at 80° C. (%) |  | 21 | 25.8 | 21 | 22 | 24.4 | 15.4 | 20 | 17.2 | 16.6 | 14 | 10 | 13.8 | 15.6 |
| Toughness at 80° C. (kJ/m²) |  | 2.2 | 5.8 | 2.6 | 3.2 | 5.7 | 2.1 | 3.4 | 2.3 | 2.2 | 1.6 | 2 | 1.9 | 2.4 |
| Visual appearance of decorative sheet |  | A | A | A | A | A | A | A | A | A | A | A | A | A |
| Adhesiveness (cross-cut peeling test) |  | 100/100 | 90/100 | 100/100 | 100/100 | 100/100 | 50/100 | 10/100 | 100/100 | 95/100 | 100/100 | 100/100 | 100/100 | 100/100 |
| Moldability (20R) |  | A | A | A | A | B | B | A | B | B | B | B | B | B |
| Moldability (30R) |  | A | A | A | A | A | A | A | A | A | A | A | A | A |

TABLE 4

|  |  | Example B14 | Example B15 | Example B16 | Example B17 | Example B18 | Comparative Example B1 | Comparative Example B2 | Comparative Example B3 | Comparative Example B4 | Comparative Example B5 | Comparative Example B6 | Comparative Example B7 |
|---|---|---|---|---|---|---|---|---|---|---|---|---|---|
| Monomer (X') | BzA | 30 |  |  |  |  | 30 |  |  | 20 | 15 |  |  |
|  | MA |  |  |  |  |  |  |  |  |  |  |  | 10 |
| Monomer (Y') | R1214 | 25 |  | 20 |  |  |  |  |  |  |  |  |  |
|  | EB8402 |  |  |  |  |  |  |  |  |  |  |  |  |
|  | A-BPE-4 |  | 40 | 20 |  |  |  |  |  |  | 20 |  |  |
|  | A-BPE-30 |  | 30 | 30 | 30 | 30 |  |  |  |  | 40 | 40 |  |
|  | EB3701 |  |  |  | 30 |  |  |  |  |  |  |  |  |
| Monomer having two radical double bonds other than monomer (Y') | C6DA | 25 | 30 | 30 | 40 | 40 | 25 | 40 | 40 | 20 | 25 | 20 | 30 |
|  | M260 |  |  |  |  |  |  | 60 | 30 | 45 |  |  | 60 |

TABLE 4-continued

|  |  | Example B14 | Example B15 | Example B16 | Example B17 | Example B18 | Comparative Example B1 | Comparative Example B2 | Comparative Example B3 | Comparative Example B4 | Comparative Example B5 | Comparative Example B6 | Comparative Example B7 |
|---|---|---|---|---|---|---|---|---|---|---|---|---|---|
| Monomer (Z') | ATM-4E | 20 |  |  |  |  | 20 |  |  |  |  |  |  |
|  | ATM-35E |  |  |  |  |  | 25 |  |  |  |  |  |  |
|  | EB8465 |  |  |  |  |  |  |  | 30 | 15 |  |  |  |
|  | EB8701 |  |  |  | 30 |  |  |  |  |  |  |  |  |
|  | UV3570 |  |  |  |  |  |  |  |  |  |  | 40 |  |
| Polymerization initiator | IRG 184 | 0.5 | 0.5 | 0.5 | 0.5 | 0.5 | 0.5 | 0.5 | 0.5 | 0.5 | 0.5 | 0.5 | 0.5 |
|  | TPO | 0.2 | 0.2 | 0.2 | 0.2 | 0.2 | 0.2 | 0.2 | 0.2 | 0.2 | 0.2 | 0.2 | 0.2 |
| Aspect ratio of microrelief structural body |  | 1.1 | 1.1 | 1.1 | 1.1 | 1.1 | 1.1 | 1.1 | 1.1 | 1.1 | 1.1 | 1.1 | 1.1 |
| Elastic modulus at 25° C. (MPa) |  | 325 | 65 | 120 | 52 | 92 | 100 | 38 | 45 | 12 | 15 | 32 | 24 |
| Elastc modulus at 80° C. (MPa) |  | 20 | 23.3 | 23.1 | 28 | 29.9 | 31.5 | 41.4 | 39.7 | 15.6 | 13.5 | 18.9 | 19.6 |
| Tenisle elongation at break at 80° C. (%) |  | 13.2 | 13 | 12.8 | 14.2 | 12.2 | 9.6 | 17.6 | 15 | 27.4 | 24.4 | 21.2 | 13.8 |
| Toughness at 80° C. (kJ/m$^2$) |  | 1.9 | 2 | 1.9 | 2.8 | 2.2 | 1.6 | 5.9 | 4.5 | 5.3 | 4.3 | 4.5 | 4.2 |
| Visual appearance of decorative sheet |  | A | B | A | B | A | A | C | C | C | C | C | C |
| Adhesiveness (cross-cut peeling test) |  | 40/100 | 100/100 | 100/100 | 100/100 | 100/100 | 100/100 | 100/100 | 100/100 | 100/100 | 100/100 | 5/100 | 100/100 |
| Moldability (20R) |  | B | B | B | B | B | C | C | C | A | B | C | B |
| Moldability (30R) |  | A | A | A | A | A | B | A | A | A | A | A | A |

The abbreviations used in the tables are as described below.

(Monomer Having One Radical Polymerizable Double Bond (X'))

BzA: benzyl acrylate
MA: methyl acrylate (Monomer Having Two Radical Polymerizable Double Bonds (Y'))

R1214: urethane (meth)acrylate having two radical polymerizable double bonds (manufactured by Dai-ichi Kogyo Seiyaku Co., Ltd., trade name: NEW FRONTIER R-1214 Mw=2000) •EB8402: urethane (meth) acrylate having two radical polymerizable double bonds (manufactured by Daicel Cytec Co., Ltd., trade name: EBECRYL 8402, Mw=1000) •A-BPE-4: ethoxylated bisphenol A diacrylate (manufactured by Shin Nakamura Chemical Co., Ltd., trade name: NK ESTER A-BPE-4, Mw=512)

A-BPE-30: ethoxylated bisphenol A diacrylate (manufactured by Shin Nakamura Chemical Co., Ltd., trade name: NK ESTER A-BPE-30, Mw=3000)

EB3701: bifunctional epoxy (meth)acrylate (manufactured by Daicel Cytec Co., Ltd., trade name: EBECRYL 3701, Mw=850)

(Monomer Having Two Radical Polymerizable Double Bonds Other than Monomer (Y'))

C6DA: 1,6-hexanediol diacrylate, •M260: polyethylene glycol diacrylate (manufactured by Toagosei Co., Ltd., trade name: ARONIX M260)

(Monomer Having Three or More Radical Polymerizable Double Bonds (Z'))

ATM-4E: ethoxylated pentaerythritol tetraacrylate (manufactured by Shin Nakamura Chemical Co., Ltd., trade name: NK ESTER ATM-4E)

ATM-35E: ethoxylated pentaerythritol tetraacrylate (manufactured by Shin Nakamura Chemical Co., Ltd., trade name: NK ESTER ATM-35E)

EB8465: trifunctional urethane (meth)acrylate (manufactured by Daicel Cytec Co., Ltd., trade name: EBECRYL 8465)

EB8701: trifunctional urethane (meth)acrylate (manufactured by Daicel Cytec Co., Ltd., trade name: EBECRYL 8701)

UV3570: dipentaerythritol hexaacrylate (manufactured by BYK Chemie Japan K.K., trade name: BYK-UV3570)

(Polymerization Initiator)

"IRG 184": 1-hydroxycyclohexyl phenyl ketone (manufactured by BASF Japan, Ltd., trade name: IRGACURE 184))

"TPO": 2,4,6-trimethylbenzoyldiphenylphosphine oxide (manufactured by BASF Japan, Ltd., trade name: LUCIRIN TPO)

As is obvious from the results indicated in Table 3, the decorative sheets including the microrelief structural body of the present invention of various Examples did not have damaged external appearance at room temperature, and did not generate defective appearance caused by heating or molding.

In Comparative Example B1, since a resin having a high crosslinking density and having a high elastic modulus even at a high temperature was used, cracks were generated as a result of heating and molding using molds having a curvature of 20R and a curvature of 30R.

Since Comparative Examples B2 and B3 had insufficient elastic moduli at room temperature, decorative sheets having satisfactory external appearance could not be obtained. Furthermore, since resins having high elastic moduli even at a high temperature and having high crosslinking densities were used, cracks were generated as a result of heating and molding using a mold having a curvature of 20R.

Comparative Examples B4 and B5 had low crosslinking densities, and no cracks were generated upon heating and molding; however, the elastic moduli at room temperature were low, and a generally hazy external appearance was obtained due to aggregation of protrusions.

In Comparative Example B6, since the elastic modulus at room temperature was insufficient, satisfactory external appearance could not be obtained. In addition, since the adhesiveness to the base material film was insufficient, defective external appearance occurred in which the cured resin was separated from the base material at the time of heating and molding using a mold having a curvature of 20R.

Comparative Example B7 had an insufficient elastic modulus at room temperature, and therefore, satisfactory external appearance could not be obtained.

Example B20

A decorative sheet of the same size was produced in the same manner as in Example B13, except that the polycarbonate sheet having a thickness of 500 μm was changed to an acrylic film (manufactured by Mitsubishi Rayon Co., Ltd., trade name: "ACRYPRENE HBK003") having a thickness of 200 μm, and the decorative sheet was evaluated.

The curable composition of Example B13 was adhering satisfactorily even to an acrylic film, and stretching of the curable composition together with the acrylic film was also enabled.

(Production of Decorative Resin Molded Body)

Furthermore, integration molding with an acrylic resin was performed using the decorative sheet thus obtained.

An injection molding die with which a circular (dome-shaped) molded body that was curved in two axial directions at a radius of curvature of 300 mm was produced, was prepared. A pin gate was provided at the center of the dome, and the die had a cavity that was curved toward the fixed side of the die (the male side (convex surface) of the die was a fixed side, and the female side (concave surface) was a movable side).

The decorative sheet was fixed on the female side of the die, and the decorative sheet was subjected to vacuum molding so as to conform to the interior of the die, by lowering a heater heated at 380° C. between the dies, warming the dies with radiant heat for 10 seconds, and subsequently drawing a vacuum through the cavity side of the die. The die was temperature-regulated to 60° C. While the decorative sheet was suctioned inside the die, the die was clamped, and an acrylic resin (manufactured by Mitsubishi Rayon Co., Ltd., trade name: "ACRYPET VH001") was injected into the die as a resin material, at a resin temperature of 260° C.

After injection molding, the mold was unclamped, and the molded body was taken out. The acrylic resin and the acrylic film of the decorative sheet were adhering satisfactorily to each other. Thus, a decorative resin molded body having a curved surface having antireflection performance imparted by the microrelief structural body on the surface of the molded body could be obtained.

INDUSTRIAL APPLICABILITY

The microrelief structural body of the present invention does not easily have the antireflection performance impaired by aggregation of convexities, and the decorative sheet of the present invention including the microrelief structural body can provide an antireflective structure on the surface of a three-dimensional molded body having a complicated shape. Furthermore, since the decorative sheet of the present invention has high molding processability while maintaining excellent optical performance, the decorative sheet can be applied, not limitedly to displays where antireflection performance is required, but even to applications such as window materials and front face plates of automobiles, trains, ships and the like having complicated shapes. Also, since reflection at the surface is suppressed, molded articles having rich designability can be obtained, and therefore, the decorative sheet of the present invention is industrially very useful.

EXPLANATIONS OF LETTERS OR NUMERALS 10, 210 MICRORELIEF STRUCTURAL BODY
11 BASE MATERIAL
12 CURED PRODUCT
13 CONVEXITY
13a APEX OF CONVEXITY
14 CONCAVITY
14a, 14b BOTTOM OF CONCAVITY
15 INTERMEDIATE LAYER
20 DECORATIVE SHEET
22 SHEET BASE MATERIAL
40 MOLD
30 ALUMINUM PLATE
31 CRACK
32 OXIDE FILM
33 DEPRESSION
34 OXIDE FILM
35 FINE PORE
42, 52 DIE
48 INJECTING MACHINE
50 RESIN GATE
54 RESIN MATERIAL
56 DECORATIVE RESIN MOLDED BODY

The invention claimed is:

1. A structural body comprising a base material, and a microrelief structural layer having a microrelief structure,
the microrelief structural layer being laminated on the base material as a surface layer of the structural body, and
the microrelief structural layer having at least one physical property selected from the group consisting of the following (A) and (B):
(A) the elastic modulus at 25° C. is 50 MPa or more, and the elastic modulus at 80° C. is 30 MPa or less; and
(B) the tensile elongation at break at 80° C. is from 20% to 100%,
wherein:
the microrelief structural layer contains a cured product obtained by curing a curable composition,
the curable composition includes at least one monomer selected from the group consisting of a monomer having one radical-polymerizable double bond (X), a monomer having two radical-polymerizable double bonds (Y), and a monomer having three or more radical-polymerizable double bonds (Z), in an amount of from 70 parts by mass to 100 parts by mass relative to 100 parts by mass of the curable components in the curable composition,
the mass average molecular weight of the monomer having two radical-polymerizable double bonds (Y) is from 600 to 8000, and
the value obtained by dividing the mass average molecular weight of the monomer having three or more radical-polymerizable double bonds (Z) by the number of groups having polymerizable double bonds is from 300 to 1000.
2. The structural body according to claim 1, wherein toughness of the microrelief structural layer was determined in a tensile test at 80° C. to range from 1 kJ/m$^2$ to 20 kJ/m$^2$.
3. The structural body according to claim 1, wherein:
the microrelief structural layer contains a cured product of a curable composition including a monomer having one radical-polymerizable double bond (X') and a monomer having two radical-polymerizable double bonds (Y'),
the total amount of the monomer having one radical-polymerizable double bond (X') and the monomer having two radical-polymerizable double bonds (Y') is from 50 parts by mass to 100 parts by mass relative to 100 parts by mass of the curable components in the curable composition, and
the monomer having two radical-polymerizable double bonds (Y') is a monomer having a mass average molecular weight of from 300 to 8000, and having at least one bonding selected from the group consisting of hydrogen bonding, π-π interaction, and ion bridging between the molecules of the monomer having two radical-polymerizable double bonds (Y').

4. The structural body according to claim 1, wherein:
the monomer having two radical-polymerizable double bonds (Y) is one or more acrylates each having two radical-polymerizable double bonds, selected from the group consisting of a urethane (meth)acrylate having two radical-polymerizable double bonds, and a polyether (meth)acrylate having two radical-polymerizable double bonds;
the monomer having three or more radical-polymerizable double bonds (Z) is one or more acrylates each having three or more radical-polymerizable double bonds, selected from the group consisting of a urethane (meth)acrylate having three or more radical-polymerizable double bonds, and a polyether (meth)acrylate having three or more radical-polymerizable double bonds; and
the total amount of the acrylate having two radical-polymerizable double bonds and the acrylate having three or more radical-polymerizable double bonds is from 30 parts by mass to 80 parts by mass relative to 100 parts by mass of the curable components in the curable composition.

5. A sheet comprising:
a resin sheet base material containing at least one resin selected from the group consisting of an acrylic resin, a polyester resin, a polycarbonate resin, an acrylonitrile-butadiene-styrene copolymer resin, a polyvinylidene fluoride resin, a vinyl chloride resin, and composites of these resins; and
the structural body according to claim 1, being laminated on at least one surface of the resin sheet base material.

6. A decorative sheet comprising the sheet according to claim 5.

7. A molded body comprising a molded base material, and the decorative sheet according to claim 6, the decorative sheet being brought into contact with the molded base material on the surface of the opposite side of the surface where the microrelief structure of the decorative sheet has been formed.

8. The molded body according to claim 7, wherein at least one interval selected from the group consisting of the interval between adjacent concavities and the interval between adjacent convexities in the microrelief structure is different in two axial directions that run straight.

9. A method for producing the structural body having a microrelief structure on the surface according to claim 1, the method including:
disposing a curable composition between a base material and a surface of a mold, the mold having a microrelief structure on that surface;
polymerizing the curable composition; and
after the curable composition is polymerized, detaching the mold.

10. A method for producing a decorative resin molded body having a microrelief structure on the surface,
the method comprising a step (A1) of obtaining a decorative resin molded body,
the step (A1) including heating the decorative sheet according to claim 6; and
pressing the heated decorative sheet against a mold by drawing a vacuum or blowing compressed air, and thereby obtaining a decorative resin molded body having a microrelief structure on the surface.

11. A method for producing a decorative resin molded body having a microrelief structure on the surface, the method comprising:
a step (B1) of pressing a mold against the decorative sheet according to claim 6 while heating the decorative sheet to thereby transfer the shape of the mold to the decorative sheet,
taking out from the mold the decorative sheet as a resultant of transfer of the mold shape, and thereby obtaining a decorative sheet having the mold shape transferred thereto; and
a step (B2) of disposing the decorative sheet obtained in the above step (B1) such that the side where a microrelief structure has been formed is brought into contact with the surface of an injection molding die,
injecting a resin material in a molten state into the injection molding die, solidifying the resin material, and
thereby obtaining a decorative resin molded body having a molded base material formed of a resin material, and a decorative sheet having the surface on the opposite side of the microrelief structure and which is in contact with the molded base material.

12. A method for producing a decorative resin molded body having a microrelief structure on the surface, the method comprising:
a step (C1) of disposing the decorative sheet according to claim 6 such that the side where a microrelief structure has been formed is brought into contact with an injection molding die; and
a step (C2) of heating the decorative sheet inside the injection molding die,
pressing a mold against the decorative sheet so that the decorative sheet conforms to the inner surface of the injection molding die, subsequently clamping the mold, injecting a resin material in a molten state into the die, solidifying the resin material, and
thereby obtaining a decorative resin molded body having a molded base material formed of the solidified resin material, and a decorative sheet in which the surface of the opposite side of the side where the microrelief structure has been formed is in contact with the molded base material.

13. A method for producing a decorative resin molded body having a microrelief structure on the surface, the method comprising:
a step (D1) of pressing a heated mold against the decorative sheet according to claim 6 to thereby transfer the shape of the mold to the decorative sheet, and obtaining a decorative resin molded body having a microrelief structure on the surface.

14. A method for producing a decorative resin molded body having a microrelief structure on the surface, the method comprising:
- a step (E1) including heating the decorative sheet according to claim 6, pressing a molded article against the heated decorative sheet, causing the decorative sheet to conform to the shape of the molded article by applying pressure, reducing pressure, or applying pressure and reducing pressure, and thereby obtaining a decorative resin molded body having a microrelief structure on the surface of the molded article.

15. A decorative resin molded body produced by the production method according to claim 10.

\* \* \* \* \*